(12) United States Patent
Ohtani et al.

(10) Patent No.: US 8,501,055 B2
(45) Date of Patent: Aug. 6, 2013

(54) TONER MANUFACTURING METHOD, A TONER MANUFACTURING APPARATUS, AND A TONER

(75) Inventors: Shinji Ohtani, Shizuoka (JP); Yoshihiro Norikane, Kanagawa (JP); Seichin Kinuta, Tochigi (JP)

(73) Assignee: Ricoh Company, Ltd., Tokyo (JP)

( * ) Notice: Subject to any disclaimer, the term of this patent is extended or adjusted under 35 U.S.C. 154(b) by 1311 days.

(21) Appl. No.: 12/299,352

(22) PCT Filed: Mar. 5, 2008

(86) PCT No.: PCT/JP2008/054441
§ 371 (c)(1),
(2), (4) Date: Nov. 3, 2008

(87) PCT Pub. No.: WO2008/114655
PCT Pub. Date: Sep. 25, 2008

(65) Prior Publication Data
US 2009/0317735 A1 Dec. 24, 2009

(30) Foreign Application Priority Data

Mar. 20, 2007 (JP) ................................ 2007-073577
Apr. 25, 2007 (JP) ................................ 2007-116226

(51) Int. Cl.
*B29C 67/02* (2006.01)
*B01J 2/18* (2006.01)

(52) U.S. Cl.
USPC ..... 264/9; 264/5; 264/12; 264/13; 430/110.4; 430/111.4; 430/137.22; 425/6

(58) Field of Classification Search
CPC .......... B01J 2/18; G03G 9/0802; G03G 9/0819
USPC ............... 264/4, 4.1, 4.3, 4.32, 4.33, 4.4, 4.6, 264/4.7, 5, 13, 9, 12; 430/137.1, 137.14, 430/108.1, 110.4, 108.4, 110.1, 111.4, 137.22; 425/6, 8, 10
See application file for complete search history.

(56) References Cited

U.S. PATENT DOCUMENTS

| | | | |
|---|---|---|---|
| 4,871,489 A * | 10/1989 | Ketcham | 264/9 |
| 5,476,744 A * | 12/1995 | Anno | 430/137.19 |
| 6,852,463 B2 * | 2/2005 | Teshima | 430/110.3 |
| 7,241,548 B2 | 7/2007 | Sugiyama et al. | |
| 7,258,428 B2 * | 8/2007 | Reddy et al. | 347/68 |
| 7,514,145 B2 * | 4/2009 | Akioka et al. | 428/402 |

(Continued)

FOREIGN PATENT DOCUMENTS

| | | |
|---|---|---|
| JP | 57-201248 | 12/1982 |
| JP | 61-141955 | 6/1986 |

(Continued)

*Primary Examiner* — Seyed Masoud Malekzadeh
(74) *Attorney, Agent, or Firm* — Cooper & Dunham LLP

(57) ABSTRACT

A toner manufacturing method, a toner manufacturing apparatus, and a toner are disclosed. The toner manufacturing apparatus includes a droplet generating unit that includes a thin film in which plural nozzles are formed, and an annular vibrating unit that is arranged at a perimeter of a deformable domain of the thin film for vibrating the thin film; a storage unit for storing a toner-containing liquid that includes at least a resin and a colorant, and for supplying the toner-containing liquid 10 to the droplet generating unit; and a granulating unit for solidifying droplets that are periodically breathed out from the nozzles of the droplet generating unit to form toner particles.

8 Claims, 13 Drawing Sheets

U.S. PATENT DOCUMENTS

| | | | |
|---|---|---|---|
| 7,709,175 B2 * | 5/2010 | Ohtani | 430/137.1 |
| 2003/0224271 A1 | 12/2003 | Teshima | |
| 2004/0048183 A1 * | 3/2004 | Teshima | 430/137.1 |
| 2004/0259013 A1 | 12/2004 | Ohtani et al. | |
| 2005/0079433 A1 | 4/2005 | Watanabe et al. | |
| 2005/0154088 A1 * | 7/2005 | Miura et al. | 523/223 |
| 2005/0158648 A1 * | 7/2005 | Makino et al. | 430/110.4 |
| 2005/0180786 A1 | 8/2005 | Yamada et al. | |
| 2005/0196691 A1 | 9/2005 | Ohtani et al. | |
| 2006/0021909 A1 | 2/2006 | Cerqueira et al. | |
| 2006/0115756 A1 * | 6/2006 | Komatsu et al. | 430/105 |
| 2006/0142425 A1 * | 6/2006 | Akioka et al. | 523/223 |
| 2006/0210909 A1 * | 9/2006 | Ohtani | 430/137.1 |
| 2006/0227179 A1 * | 10/2006 | Temple et al. | 347/68 |
| 2006/0240354 A1 | 10/2006 | Ohtani | |
| 2008/0063971 A1 * | 3/2008 | Watanabe et al. | 430/110.4 |
| 2009/0004593 A1 * | 1/2009 | Kaiho et al. | 430/113 |

FOREIGN PATENT DOCUMENTS

| | | |
|---|---|---|
| JP | 63-40593 | 8/1988 |
| JP | 7-152202 | 6/1995 |
| JP | 10-186719 | 7/1998 |
| JP | 10-207121 | 8/1998 |
| JP | 2003-241426 | 8/2003 |
| JP | 2003-262976 | 9/2003 |
| JP | 2004-18671 | 1/2004 |
| JP | 3786035 | 3/2006 |
| JP | 2006-293320 | 10/2006 |
| JP | 2006-297325 | 11/2006 |
| JP | 2006-343635 | 12/2006 |

* cited by examiner

TONER MANUFACTURING METHOD, A TONER MANUFACTURING APPARATUS, AND A TONER

TECHNICAL FIELD

The present invention generally relates to a toner manufacturing method, a toner manufacturing apparatus, and a toner; and especially relates to a toner manufacturing method employing a spray granulating method, a toner manufacturing apparatus employing the spray granulating method, and a toner manufactured by the spray granulating method.

BACKGROUND ART

A developer for developing an electrostatic latent image in electronic photography, electrostatic recording, electrostatic printing, and the like, is first adhered to an image supporting object such as an electrostatic latent image supporting object on which the electrostatic latent image is formed in a development process. The developer is then transferred to a transfer medium such as from the electrostatic latent image supporting object in a transfer process; and then the developer is fixed to the paper in a fixing process. Here, the developer for developing the electrostatic latent image formed on the latent image supporting object includes a two-component system developer that consists of a carrier and a toner, and a single component system developer such as a magnetic toner and a non-magnetism toner that do not include the carrier.

Conventionally, dry toner is used for electronic photography, electrostatic recording, electrostatic printing, and the like, where the dry toner is the so-called ground type toner that is made of a toner binder (such as styrene system resin and a polyester system resin) and a colorant that are melt-kneaded and ground (pulverized).

Recently and continuing, so-called polymerization type toners are being examined for the developer. The polymerization type toners are produced by a toner manufacturing process including a suspension polymerization method, and an emulsion polymerization condensing method. In addition, a polymer dissolution suspending method is also being examined, where the method generates a volumetric shrinkage (Patent Reference 1). According to this method, a toner material is dispersed and dissolved in volatile solvents, such as a low boiling-point organic solvent; emulsified and made into droplets in an aquatic medium that contains a dispersant; then the volatile solvent is removed. This method provides great flexibility concerning resins, and is applicable to a polyester resin unlike the suspension polymerization method and the emulsion polymerization condensing method. The polyester resin is desirable in a full color process where transparency, flat, and smooth natures of an image after fixing are required.

However, according to the conventional methods of manufacturing the polymerization type toner, it is premised that the dispersant be used in the aquatic medium. The dispersant, which spoils the charging characteristic of the toner, tends to remain on the surface of the toner to degrade environmental stability. Accordingly, it is attempted that the dispersant be washed away; for this, a great amount of water is required. For this reason, the methods are not necessarily satisfactory.

Another conventional practice uses a spray drying method for manufacturing the toner, wherein an aquatic medium is not used (Patent Reference 2). According to this method, an atomizer produces particles by ejecting one of melting liquid of toner material and liquid wherein toner-containing liquid is dissolved. Then, the ejected particles are dried to obtain toner particles. Accordingly, the problem due to using the aquatic medium is not generated.

Nevertheless, the toner particles obtained by the conventional spray granulating method are comparatively coarse and large; and particle size distribution is also great. That degrades characteristics of the toner.

Then, in an attempt to replace the conventional practices, Patent Reference 3 proposes a method and an apparatus for manufacturing the toner. According to this method, minute droplets are formed by using a piezo-electric impulse, and the droplets are dried. Further, Patent Reference 4 proposes a method of forming minute droplets by using thermal expansion in a nozzle; the formed droplets are dried.

[Patent reference 1] JPA H7-152202
[Patent reference 2] JP S57-201248
[Patent reference 3] JP 3786034
[Patent reference 4] JP 3786035

Nevertheless, according to the toner manufacturing method and apparatus proposed by Patent References 3 and 4, one piezo-electric object causes discharging droplets from only one nozzle, that is, the number of droplets that are discharged in a unit time is relatively small, and the productivity is low.

Then, the applicant of the present invention has disclosed toner manufacturing methods and apparatuses by Patent References 5 and 6. According to Patent Reference 5, a nozzle is vibrated by expansion and contraction of a piezo-electric object so that droplets of toner containing fluid are discharged at a fixed frequency, then the droplets are solidified to become toner. According to Patent Reference 6, a discharging member having a discharging hole, and a vibration unit are included, wherein the discharging member is vibrated by the vibration unit so that droplets are discharged from the discharging hole; then, the droplets are dried and solidified to make the toner particles.

[Patent Reference 5] JPA 2006-293320
[Patent Reference 6] JPA 2006-297325

Nevertheless, according to Patent Reference 5, the piezo-electric object faces the circumferential edge of the nozzle, and vibrates the nozzle by expansion and contraction of the piezo-electric object; then, only a domain of the nozzle is vibrated, which domain corresponds to an opening of the piezo-electric object. That is, a sufficient displacement of the nozzle is not obtained. Accordingly, when discharging the toner-containing liquid 10 that has a great viscosity (for example, 10 mPa·s) containing a great amount of solid components, the nozzle tends to be clogged, that is, the toner cannot be stably and efficiently produced. In addition, although Patent Reference 6 discloses a technique of vibrating a droplet discharging unit with a piezo-electric object, it does not disclose any specific configuration, and its scope does not exceed Patent Reference 5.

DISCLOSURE OF THE INVENTION

Then, the present invention is made in view of the problems described above, and provides a configuration wherein a member in which nozzles are formed is greatly displaced.

According to the present invention, the productivity of toner is improved, and the produced toner has a small variation in characteristics such as fluidity and charging compared with conventional toners.

The present invention provides a toner manufacturing method, a toner manufacturing apparatus, and a toner that substantially obviate one or more of the problems caused by the limitations and disadvantages of the related art.

Features of embodiments of the present invention are set forth in the description that follows, and in part will become apparent from the description and the accompanying drawings, or may be learned by practice of the invention according to the teachings provided in the description. Problem solutions provided by an embodiment of the present invention may be realized and attained by a toner manufacturing method, a toner manufacturing apparatus, and a toner particularly pointed out in the specification in such full, clear, concise, and exact terms as to enable a person having ordinary skill in the art to practice the invention.

To achieve these solutions and in accordance with an aspect of the invention, as embodied and broadly described herein, an embodiment of the invention provides a toner manufacturing method, a toner manufacturing apparatus, and a toner as follows.

According to the embodiment of the present invention, the toner manufacturing method includes a droplet generating process of generating droplets of a toner-containing liquid that contains at least a resin and a colorant, wherein the droplets are periodically discharged from two or more nozzles by a droplet generating unit that includes a thin film in which the nozzles are formed, and a vibrating unit for vibrating the thin film, wherein the vibrating unit (annular vibrating unit) is formed in a circular shape, and is arranged at the perimeter of a deformable domain (a domain in which a deformation of the thin film is possible), and a granulating process of solidifying the droplets.

The toner manufacturing apparatus according to the embodiment of the present invention includes a droplet generating unit that includes a thin film wherein two or more nozzles are formed, and an annular vibrating unit in the shape of a circle that is arranged at the perimeter of a deformable domain of the thin film for vibrating the thin film, a storage unit for storing the toner-containing liquid 10 that contains at least a resin and a colorant and for supplying the toner-containing liquid 10 to the droplet generating unit, and a granulating unit for solidifying the droplets of the toner-containing liquid 10 periodically discharged from the nozzles of the droplet generating unit to produce toner particles.

According to the toner manufacturing method and the toner manufacturing apparatus of the embodiment of the present invention, the toner-containing liquid 10 is discharged in droplets by the droplet generating unit that includes the annular vibrating unit arranged at the perimeter of the deformable domain of the thin film that has the nozzles. Accordingly, the thin film is efficiently vibrated, the droplets are efficiently breathed out from the nozzles, and the toner particles (collectively, toner) can be efficiently produced. Further, an unprecedented monodisperse of the toner particle size is obtained.

The toner particles manufactured according to the embodiment of the present invention have smaller variations in desired characteristic values such as fluidity and a charging nature compared with conventional toners.

BEST MODE FOR CARRYING OUT THE INVENTION

Figure 1:
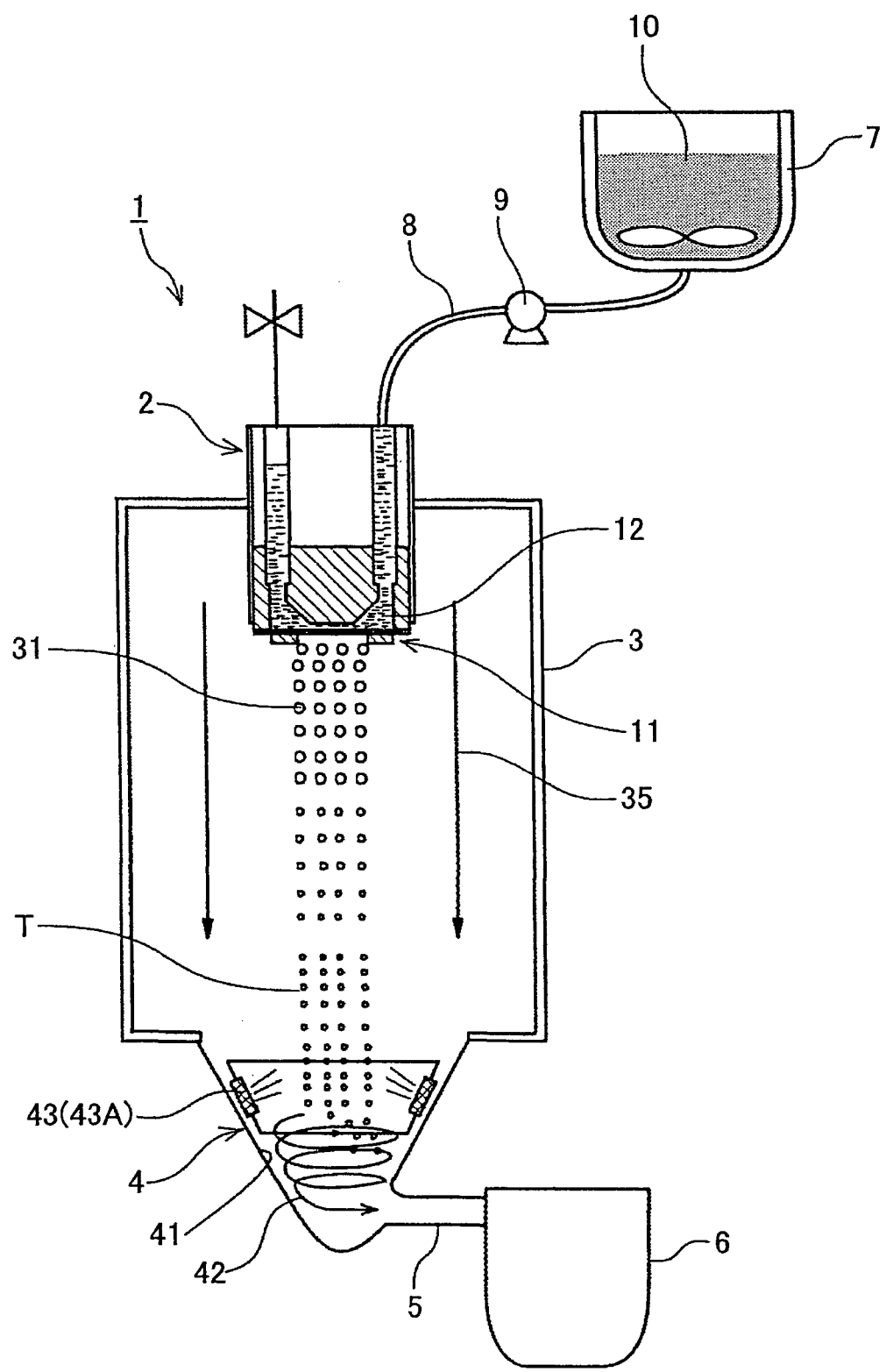
FIG. 1 is a schematic diagram of a toner manufacturing apparatus that carries out a toner manufacturing method according to an embodiment of the present invention.

In the following, embodiments of the present invention are described with reference to the accompanying drawings. First, an embodiment of a toner manufacturing apparatus 1 that carries out a toner manufacturing method according to the present invention is described with reference to FIG. 1.

The toner manufacturing apparatus 1 includes a droplet generating apparatus 2 that includes a storage unit for storing a toner-containing liquid, and a droplet generating unit 11 for generating droplets of the toner-containing liquid 10, a granulating unit 3 for solidifying the droplets discharged (breathed out) from the droplet generating apparatus 2 to form toner particles T, where the droplet generating apparatus 2 is arranged at an upper part of the granulating unit 3, a toner collecting unit 4 for collecting the toner particles T formed by the granulating unit 3, a toner storage unit 6 for storing the toner particles T collected by the toner collecting unit 4, wherein the toner particles T are conveyed through a tube 5, a raw-material storing unit 7 for holding the toner-containing liquid 10, and a pump 9 for force-feeding the toner-containing liquid 10 from the raw-material storing unit 7.

Figure 2:
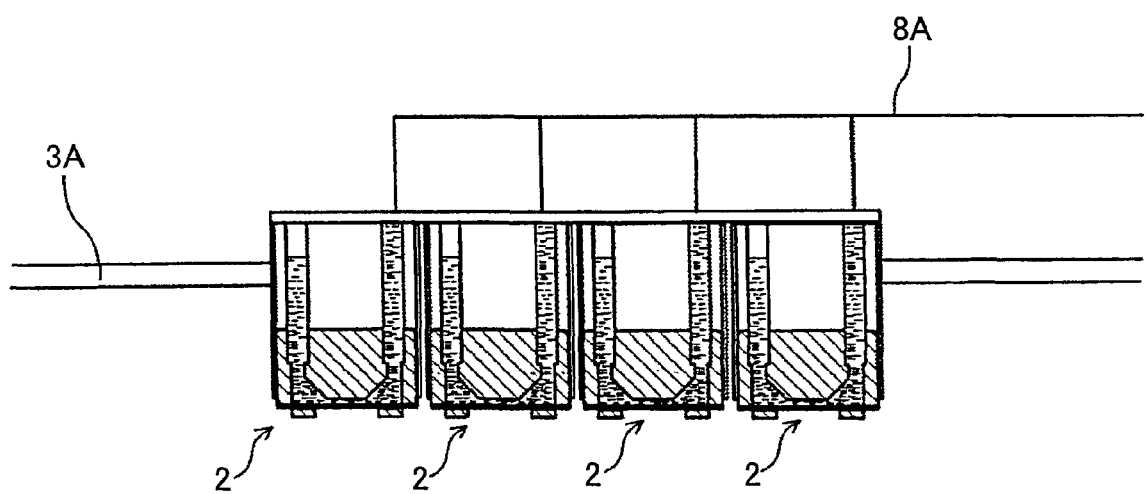
FIG. 2 is a schematic diagram showing an exemplary application of the toner manufacturing apparatus.

FIG. 1 illustrates an example wherein only one droplet generating apparatus 2 is arranged. However, in actual implementations, it is preferred that two or more droplet generating apparatuses 2 be provided for improving the productivity. FIG. 2 shows the case wherein four droplet generating apparatuses 2 are provided. Nevertheless, the number of the droplet generating apparatuses 2 may be greater; for example, the number may range between 100 and 1,000 from the view point of controllability. As shown in FIG. 2, the droplet generating apparatuses 2 are arranged at an upper surface 3A of the granulating unit 3, and piping 8A leads the toner-containing liquid 10 from the raw-material storing unit 7 (common liquid reservoir) to each droplet generating apparatus 2. In this way, the number of the droplets that are discharged can be increased, and the productivity is enhanced.

Although the toner manufacturing apparatus 1 includes the pump 9, it is dispensable; that is, the toner-containing liquid 10 can be supplied to the droplet generating apparatus 2 from the raw-material storing unit 7 without the pump 9. Here, the toner-containing liquid 10 is one of a solution and a disperse liquid in which a toner composite that includes at least a resin and a colorant is dissolved or dispersed, respectively, in a solvent.

Figure 3:
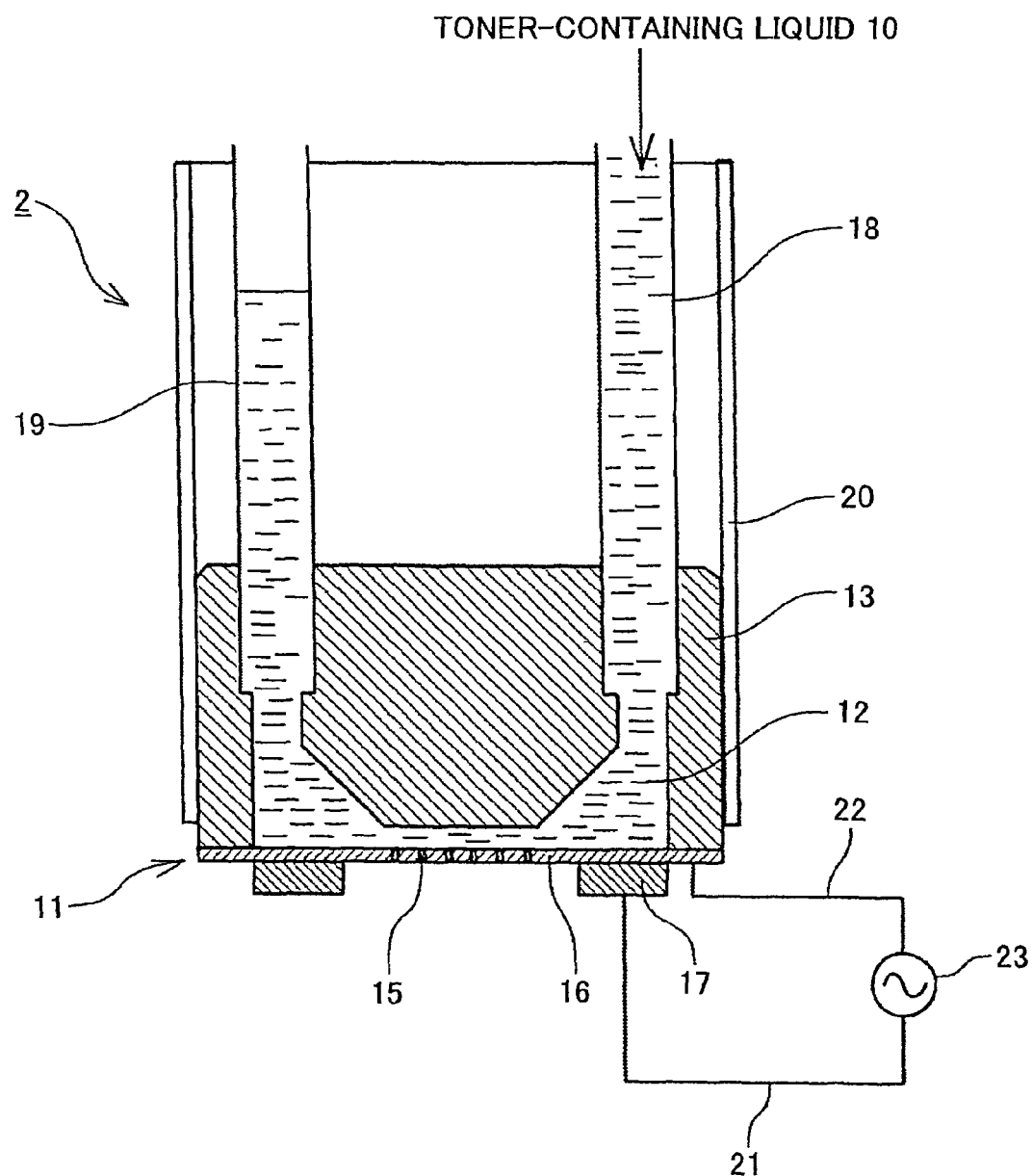
FIG. 3 is a schematic diagram of a droplet generating apparatus of the toner manufacturing apparatus.
Figure 4:
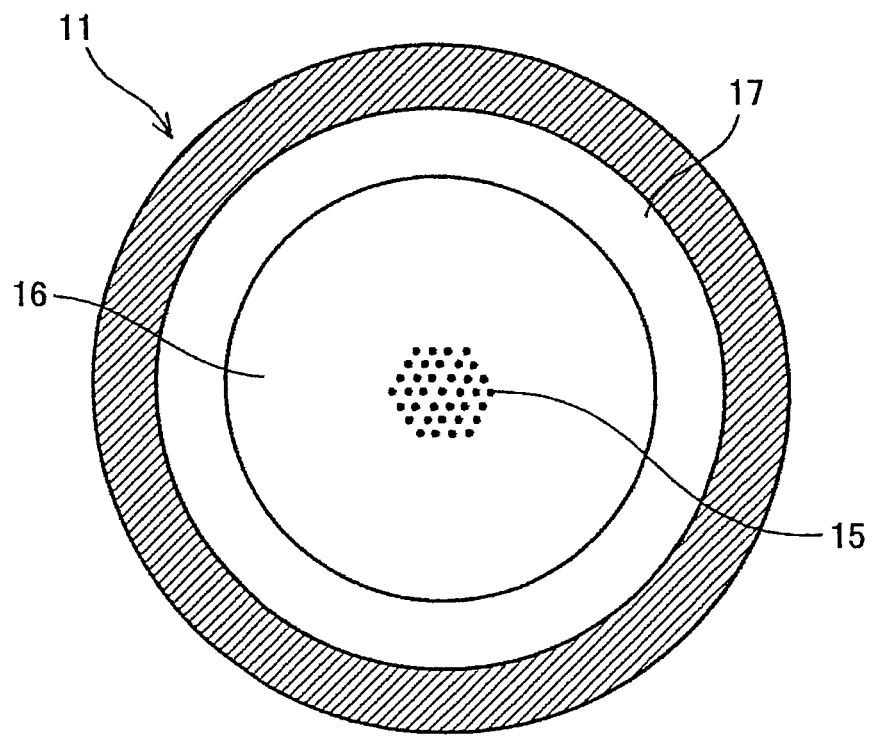
FIG. 4 is a bottom view of the droplet generating apparatus.
Figure 5:
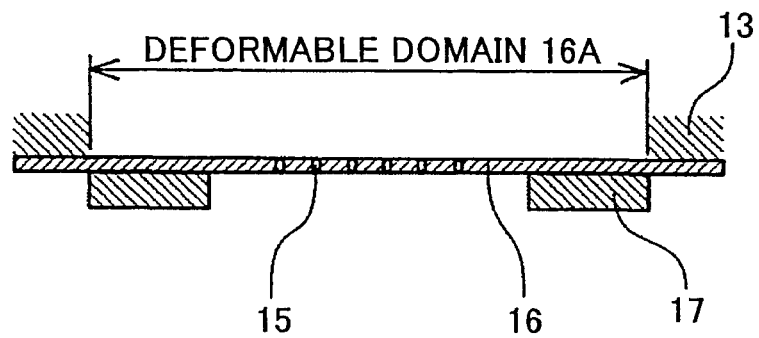
FIG. 5 is an enlarged cross-sectional diagram of a droplet generating unit of the droplet generating apparatus.

Next, the droplet generating apparatus 2 is described with reference to FIGS. 3 through 5. Here, FIG. 3 is a cross-sectional view of the droplet generating apparatus 2, FIG. 4 is a bottom view of the droplet generating apparatus 2, and FIG. 5 is a cross-sectional view of a droplet generating unit 11.

The droplet generating apparatus 2 includes the droplet generating unit 11 for generating droplets of the toner-containing liquid 10, and a channel component 13 wherein a liquid channel 12 is formed for supplying the toner-containing liquid 10 to the droplet generating unit 11.

The droplet generating unit 11 includes a thin film 16 in which two or more nozzles (discharge openings) 15 are formed, and an electromechanical transducer 17 (annular vibrating unit) in the shape of a circle for vibrating the thin film 16. The outer perimeter (a shaded domain in FIG. 4) of the thin film 16 is adhered and affixed to the channel component 13 with one of solder and a resin bonding material that does not dissolve in the toner-containing liquid 10.

The electromechanical transducer 17 (annular vibrating unit) is arranged at the perimeter of a deformable (displaceable) domain 16A of the thin film 16, i.e., the domain that is not fixed to the channel component 13. A drive circuit (drive signal generation source) 23 provides a drive voltage (drive signal) of a predetermined frequency to the electromechanical transducer 17 through wires 21 and 22, and a bending vibration, for example, is generated.

Here, no special limitations apply to the material of the thin film 16 and the configuration of the nozzle 15. However, from the viewpoint of obtaining highly uniform particle size of the droplets, it is desirable that the thin film 16 be formed with a metal plate with a thickness between 5 and 500 μm, and that the diameter of the opening of the nozzle 15 be between 3 and 35 μm. Here, the diameter of the opening is the diameter if the opening of the nozzle 15 is a true circle; if it is an ellipse, the diameter is the minor axis. Further, it is desirable that the number of the nozzles 15 is between 2 and 3000.

No special limitations apply to the material of the electromechanical transducer 17 as long as a stable vibration can be given to the thin film 16 at a fixed frequency as described above. Accordingly, it is desirable that a piezo-electric object capable of providing a bimorph deflection (flexural) vibration is provided. The piezo-electric object may be piezo-electric ceramics, such as lead zirconium titanate (PZT). Since the amount of displacement is not generally great, the material is often laminated to obtain a sufficient amount of displacement. In addition, the piezo-electric object may be a piezo-electric polymer such as polyvinylidene fluoride (PVDF), and single crystals, such as crystal, $LiNbO_3$, $LiTaO_3$, and $KNbO_3$.

A liquid supply tube 18 for supplying the toner-containing liquid 10 to the liquid channel 12 and a bubble discharge tube 19 for discharging bubbles are connected to the channel component 13 at least at one position. The droplet generating apparatus 2 is arranged at an upper part of the granulating unit 3 by a supporting component 20 affixed to the channel component 13. Here is an example wherein the droplet generating apparatus 2 is arranged at the upper part of the granulating unit 3; nevertheless, the droplet generating apparatus 2 may be arranged at either a drying section sidewall or the bottom of the granulating unit 3.

Figure 6:
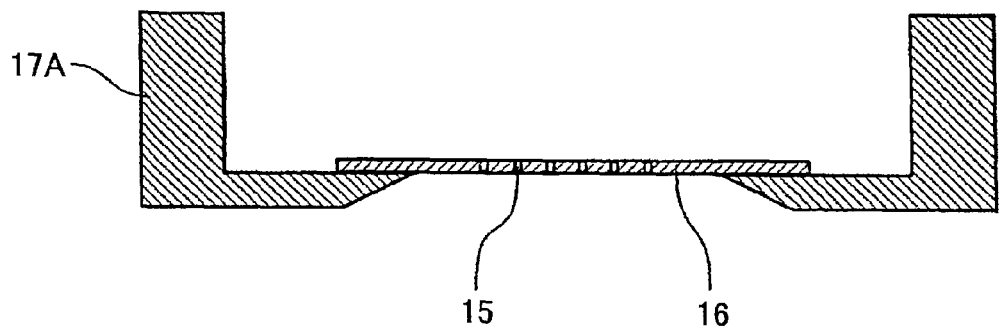
FIG. 6 is an enlarged cross-sectional diagram of a comparative example of the droplet generating unit.

As described, according to the embodiment, the droplet generating unit 11 includes the electromechanical transducer (annular vibrating unit) 17 in the shape of a circle arranged at the perimeter of the deformable domain 16A of the thin film 16 that has the nozzles 15 adjacent to the liquid channel 12. This is compared with a comparative example as shown in FIG. 6, wherein an electromechanical transducer 17A holds the perimeter of the thin film 16. According to the embodiment, the amount of displacement of the film 16 is great compared with that of the comparative example. The nozzles 15 can be arranged in a relatively greater area (such as 1 mmφ or greater) than the comparative example. Accordingly, a greater number of droplets can be stably produced than the comparative example.

Figure 7:
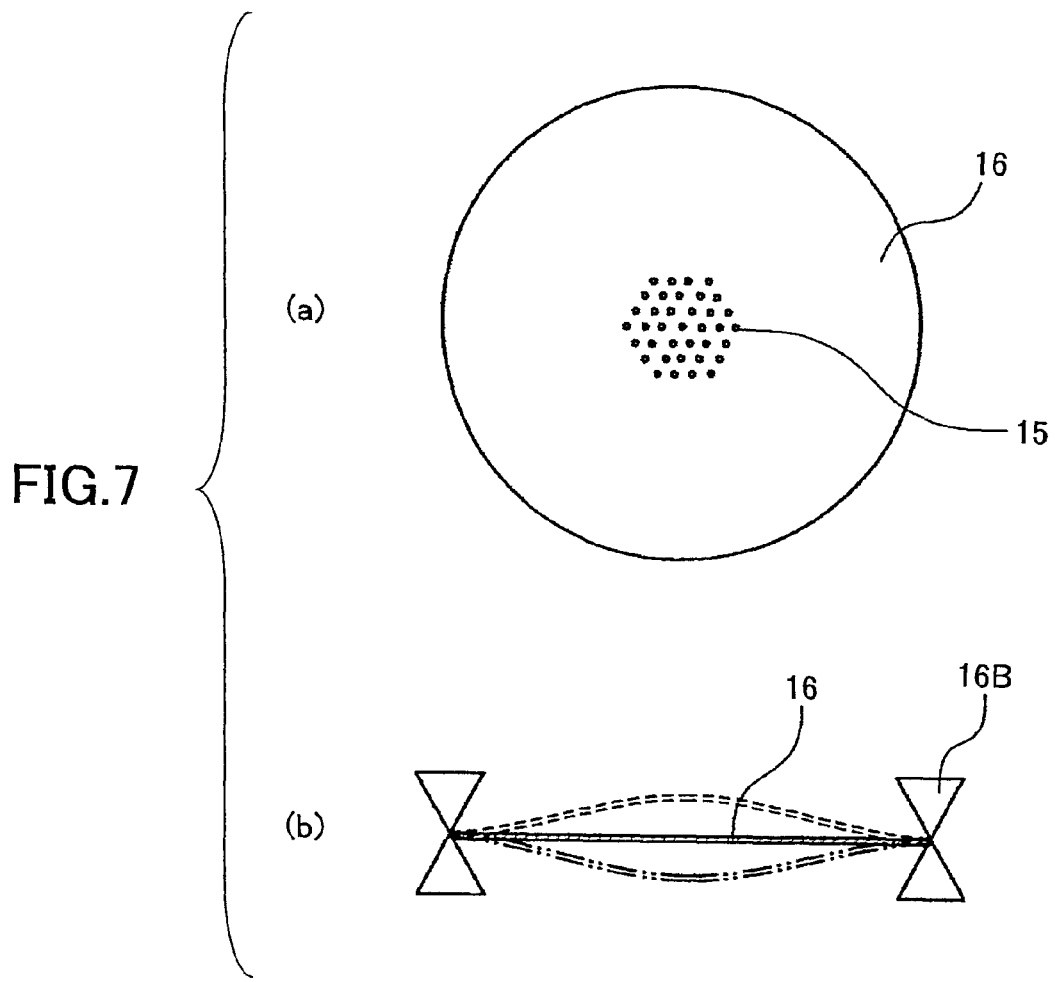
FIG. 7 is a schematic diagram of a thin film of the droplet generating unit, showing the operating principle.
Figure 8:
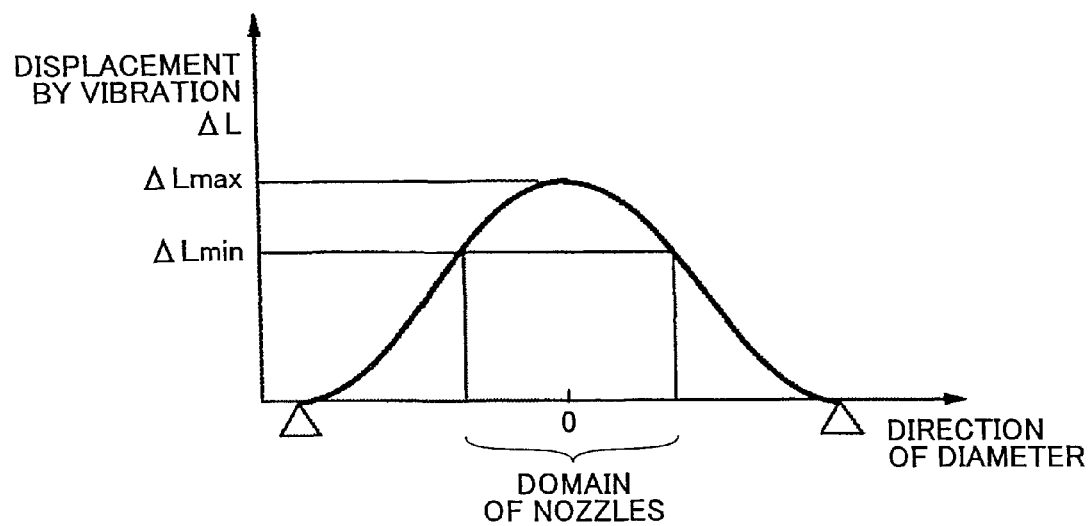
FIG. 8 is a graph illustrating a basic mode of vibration of the thin film.

The principle of operations of the droplet generating unit 11 is described with reference to FIG. 7. Circumference 16B of the thin film 16 as shown in the upper part of FIG. 7 (indicated by (a)) is fixed as shown in the lower part of FIG. 7 (indicated by (b)). When the thin film 16, which is circular, is vibrated with the circumference 16B of the circular thin film 16 fixed (that is, the perimeter of the deformable domain 16A is fixed), the circumference becomes a node and basic vibration becomes as shown in FIG. 8. Specifically, the amount of displacement Δ is the greatest (ΔLmax) at a center O of the circular thin film 16. Here, the thin film 6 vertically and periodically vibrates up and down.

Figure 9:
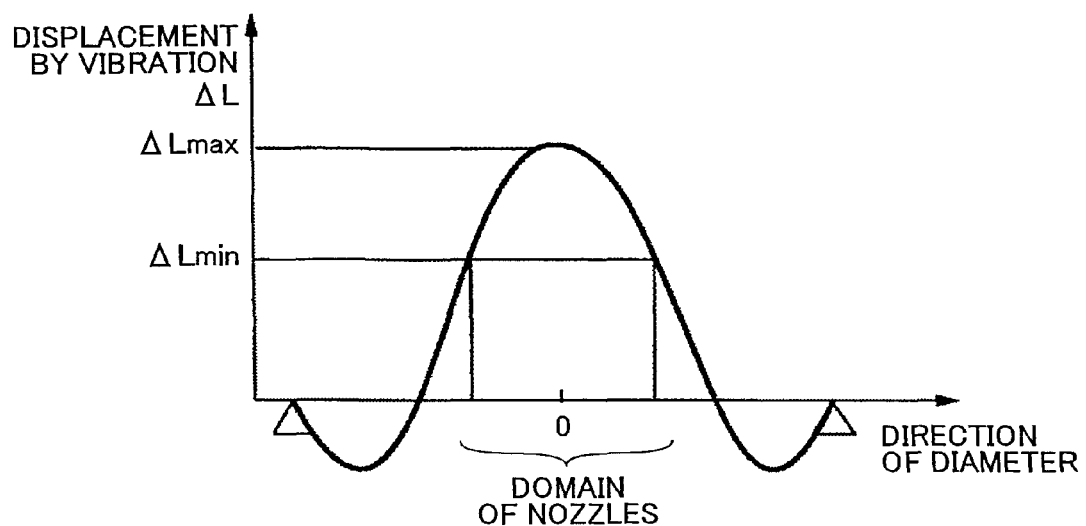
FIG. 9 is a graph illustrating a second mode of vibration of the thin film.
Figure 10:
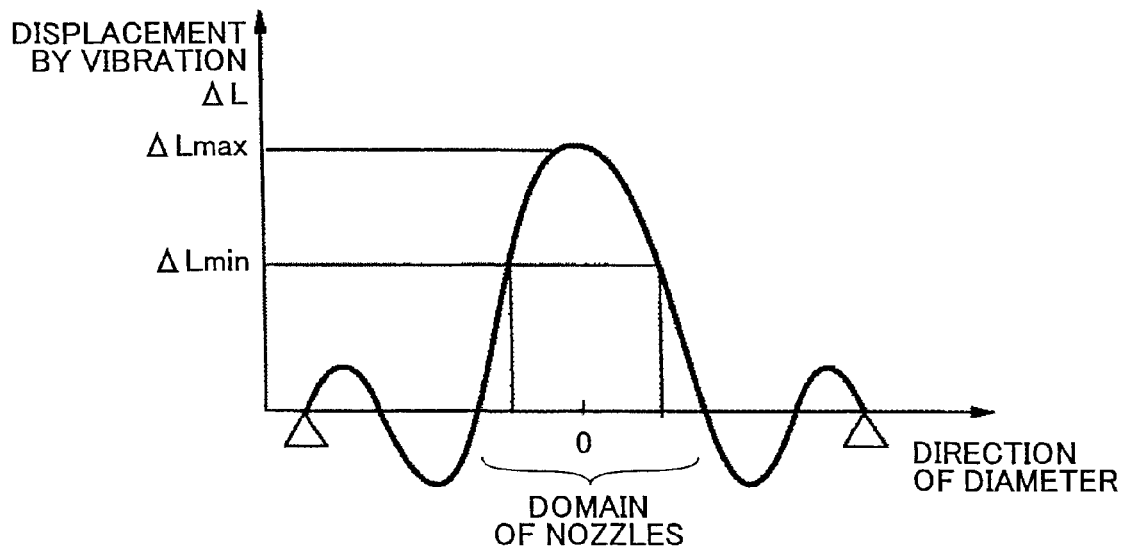
FIG. 10 is a graph illustrating a third mode of vibration of thin film.
Figure 11:
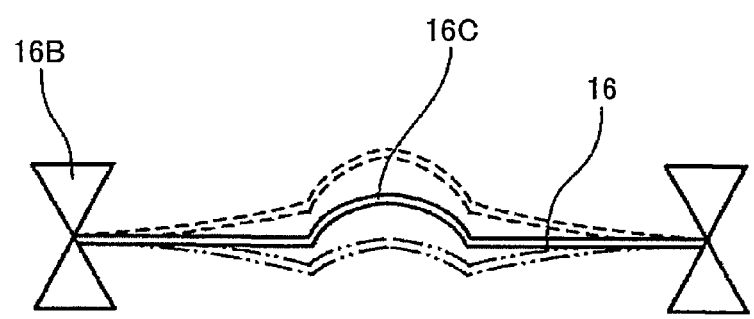
FIG. 11 is a schematic diagram of the thin film that has a convex at a central section of the thin film.

It is desirable that the thin film 16 vibrate in a mode of vibration that does not have a node in the diameter direction other than the node of the circumference 16 as shown in FIG. 8. In addition, it is known that higher order modes of vibration are present such as shown in FIGS. 9 and 10. The higher order modes have one or more nodes in the shape of a concentric circle on the circular thin film 16. Such nodes essentially have a deformation symmetrical in the diameter direction. Further, as shown in FIG. 11, a convex part 16C may be formed at the central part of the circular thin film 16, which enables to control a direction of droplet discharging, and to adjust the amount of a vibration amplitude. Details of the configuration shown in FIG. 11 are described below.

Now, when the circular thin film 16 vibrates, pressure Pa proportional to a velocity Vm of vibration of the thin film 16 is applied to the toner-containing liquid 10 near the nozzles 15 formed in the thin film 16. It is known that the pressure Pa is generated as a reaction of a radiation impedance Zr of a medium (here, the toner-containing liquid 10), and can be expressed by a product of the radiation impedance Zr and the velocity Vm of vibration of the thin film 16 as shown by the following Formula 1.

[Formula 1]

$$Pa(r,t)=Zr\times Vm(r,t) \quad (1)$$

The velocity Vm of vibration of the thin film 16 periodically fluctuates with time, and is therefore a function of time.

Accordingly, Vm can take a form of various periodic fluctuations such as a sine wave and a rectangular wave. Further, as described above, the amount of displacement in the vibrating direction of the thin film 16 may be different from position to position, and the velocity Vm of vibration is also a function of the position coordinates on the thin film 16. Since the desirable vibration mode of the thin film 16 is a deformation symmetrical in the diameter direction as above-described, the velocity Vm can be essentially expressed by a function of polar coordinates. Accordingly, r and t in the formula 1 are radius and tangent of the polar coordinates.

As described above, the pressure is generated in proportion to the vibration velocity Vm of the thin film 16, which vibration velocity Vm has a distribution; the toner-containing liquid 10 in the liquid channel 12 is breathed out to a gaseous phase corresponding to the periodic change of the pressure; the toner-containing liquid 10 is periodically discharged from the liquid phase to the gaseous phase to form a sphere according to the surface-tension difference between the liquid phase and the gaseous phase; and the toner-containing liquid 10 is discharged in droplets from the nozzles 15.

Figure 12:
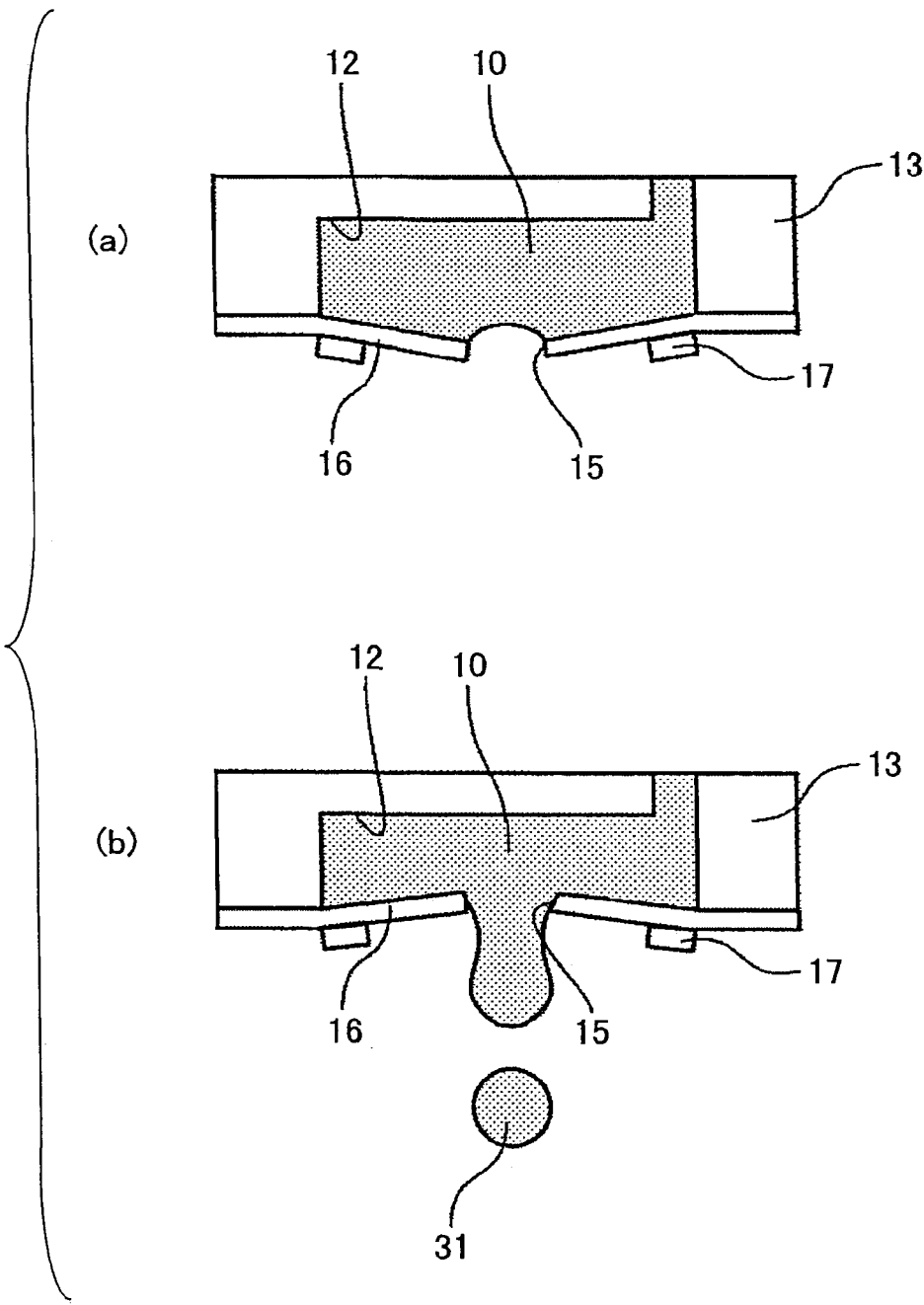
FIG. 12 is a schematic diagram illustrating the operating principle of the droplet generating unit.

This situation is illustrated in FIG. 12. The thin film 16 is vibrated between where it is bent toward the liquid channel 12 (upper part of FIG. 12 indicated as (a)) and the opposite side (lower part of FIG. 12 indicated as (b)) by the electromechanical transducer 17 providing bending vibration to the deformable domain of the thin film 16. As a result, the toner-containing liquid 10 is made into a droplet 31 by the vibration of the thin film 16, and the droplet 31 is breathed out (discharged).

Here, it is desirable that the vibrating frequency of the thin film 16 is between 20 kHz and 2.0 MHz, more desirably between 50 kHz and 500 kHz. With the vibrating frequency equal to or greater than 20 kHz, dispersal of particles, such as paints and wax, in the toner-containing liquid 10 is promoted by excitation of the liquid.

Further, if the pressure Pa is 10 kPa or greater, the particle disperse is more suitably promoted.

Here, the diameter of the droplet 31 formed tends to be greater if the amount of displacement of a domain in which the nozzles 15 are formed in the thin film 16 is great. Conversely, if the amount of displacement is small, the diameter of the droplet 31 becomes small, or, in some cases, no droplet is generated. Accordingly, it is important that the nozzles 15 be formed in the thin film 16 at appropriate positions with regard to the amount of displacement.

Specifically, a domain wherein the amount of displacement of the thin film 16 ranges between ΔLmax and ΔLmin is considered. That is, in the considered domain, the amount of displacement ranges between ΔLmax and ΔLmin. Through experiments, it is found that the distribution of toner particle sizes (diameters) is satisfactory for producing a high-quality image if the nozzles 15 are provided in a domain wherein a ratio ΔLmax/ΔLmin is equal to or less than 2.0.

Figure 13:
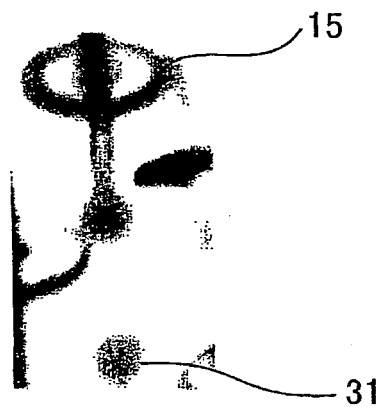
FIG. 13 is an electron microscope photograph of droplets breathed out by the droplet generating unit.
Figure 14:
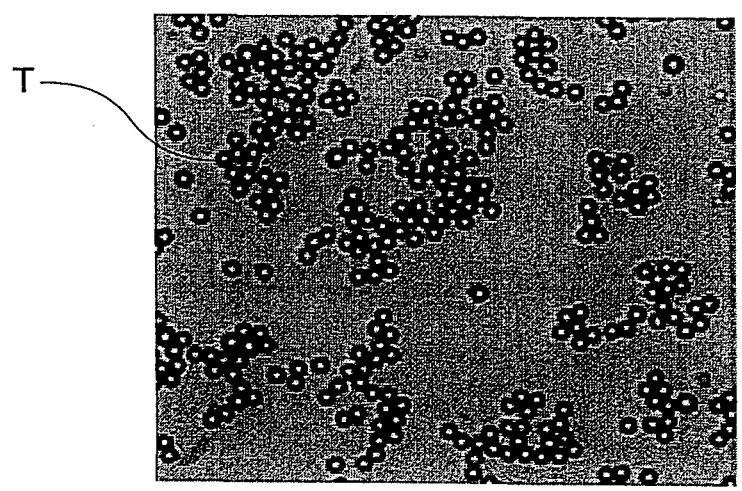
FIG. 14 is an electron microscope photograph of toner particles that are dried and solidified.
Figure 15:
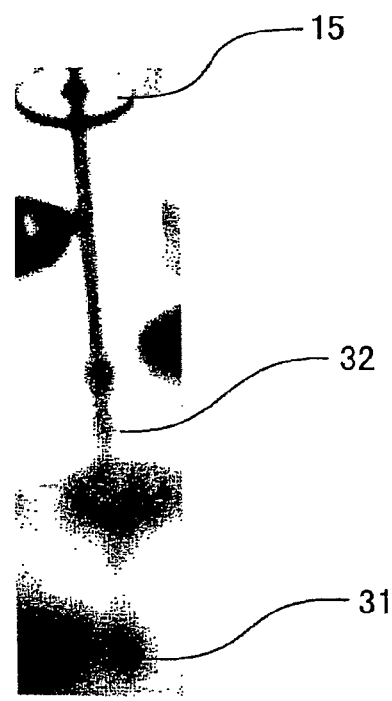
FIG. 15 is an electron microscope photograph of droplets breathed out in the case of a Comparative Example.
Figure 16:
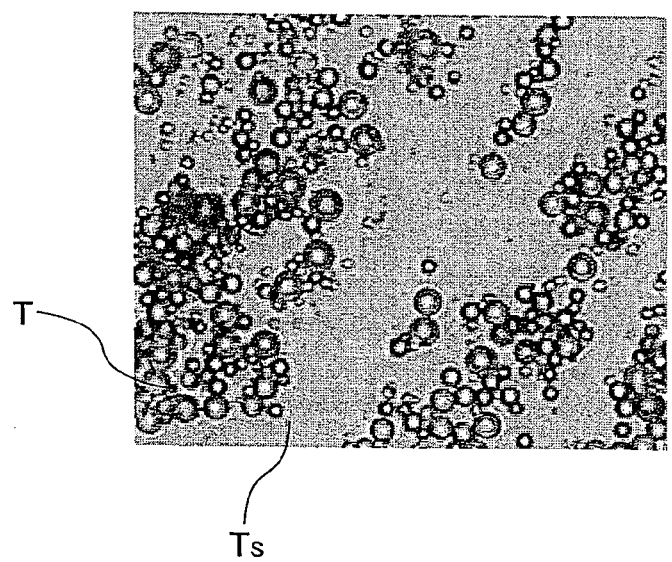
FIG. 16 is an electron microscope photograph of toner particles that are dried and solidified in the case of the Comparative Example.

Further, if a satellite particle (a particle having a diameter of about 1/10 of a main droplet formed) is generated, it degrades the distribution of the toner particle sizes. Specifically, FIG. 13 is a photograph when the droplet 31 is suitably discharged. FIG. 14 is a photograph of the toner particles T that are dried and solidified, showing mono-distribution. In contrast, FIG. 15 is a photograph wherein two or more satellites 32 are generated behind the main droplet 31, which occurs if the pressure Pa exceeds 500 kPa. In this case, many small particles Ts that are smaller than the main particle are generated as shown in FIG. 16.

In this connection, experiments were conducted by changing conditions of the toner-containing liquid 10. It was found that a satellite generation starting domain was the same in a domain wherein viscosity was 20 mPa·s or less, and surface tension was between 20 and 75 mN/m. Based on this finding, it was determined that a desired range of the pressure was between 10 Pa and 500 kPa; and more preferably, 100 kPa or less. Satellite generation can be reduced where the pressure is within the range. In other words, the nozzles 15 are to be arranged in a domain of the thin film 16 wherein the pressure is within the above-described range.

Next, with reference to FIG. 1 once again, the granulating unit 3 for solidifying the droplets 31 of the toner-containing liquid 10 to form the toner particles T is described.

Here, since the toner-containing liquid 10 is one of the solution and disperse liquid wherein the toner composite that contains at least resin and colorant is dissolved or dispersed, respectively, in the solvent as described above, the toner particles T are formed by drying and solidifying the droplets 31. That is, according to the embodiment, the granulating unit 3 dries the droplets 31 for removing the solvent of the droplets 31 to form the toner particles T. Accordingly, the granulating unit 3 may be called a solvent removing unit and a drying unit.

Specifically, the droplets 31 discharged from the nozzles 15 of the droplet generating apparatus 2 are conveyed by a dry gas 35 that flows in the flight direction of the droplets 31 in the granulating unit 3, and the solvent of the droplets 31 is removed to form the toner particles T. Here, the dew point temperature of the dry gas 35 under the atmospheric pressure is −10 degrees C. or less. The dry gas 35 may be any gas that can dry the droplets 31, such as air, and nitrogen.

Next, the toner collecting unit 4 that collects the toner particles T formed by the granulating unit 3 is described.

The toner collecting unit 4 is cascaded to the granulating unit 3 in the flight direction of the particles T, and includes a tapering section 41. That is, the entrance side (i.e., on the side of the droplet generating apparatus 2) of the tapering section 41 is greater in diameter than the outlet side. In the toner collecting unit 4, a gas flow 42, which is a vortex that goes to the down-stream side, is generated, for example, by a suction pump that is not illustrated so that the toner particles T may be collected by the gas flow 42. In this way, the toner particles T are collected by centrifugal force of the vortex of the gas flow 42, and conveyed to the toner storage unit 6 that is provided in the down-stream.

Figure 17:
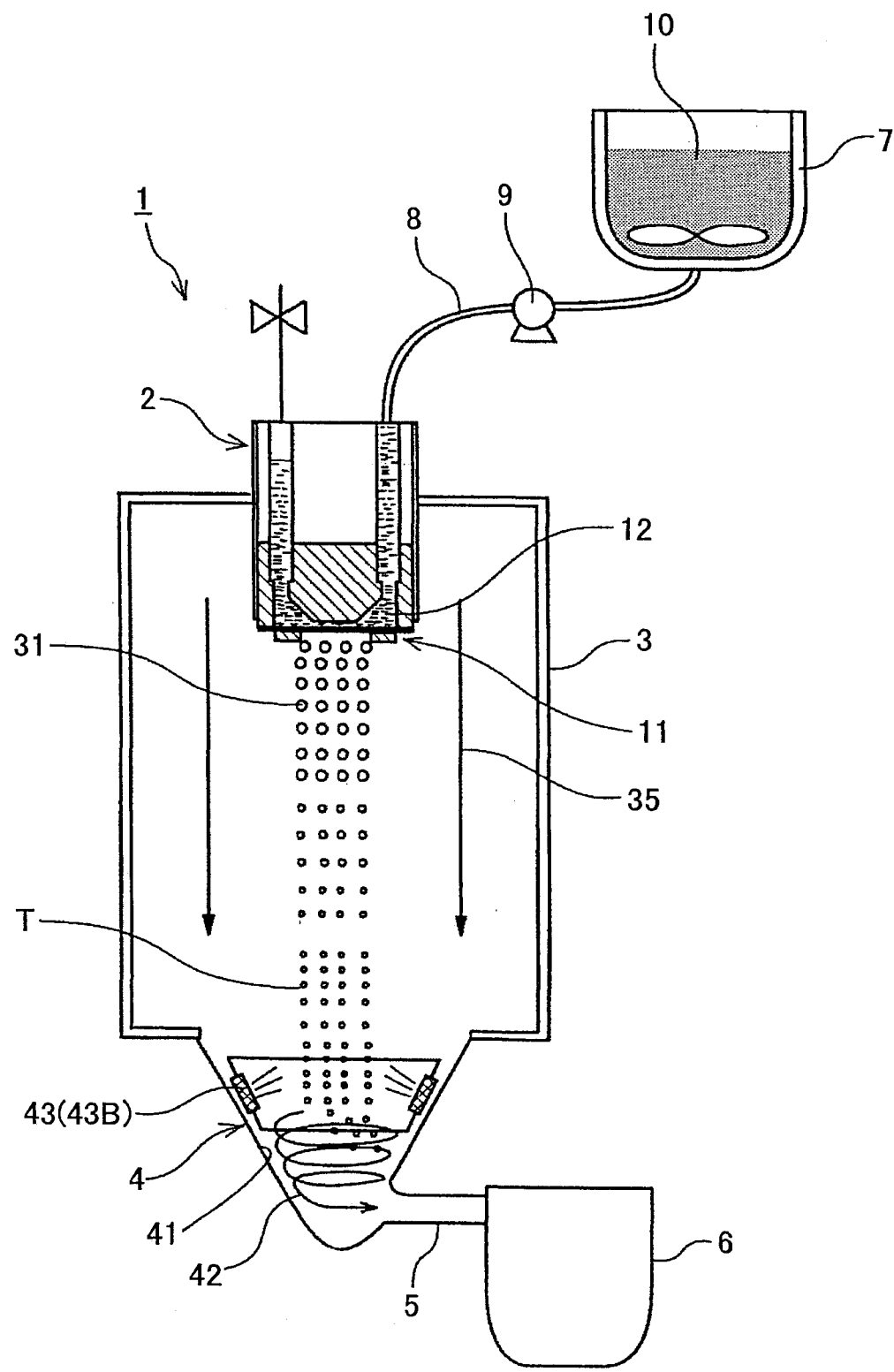
FIG. 17 is a schematic diagram of another example of the toner manufacturing apparatus according to the embodiment of the present invention.

Further, a charge removing unit 43 is provided at the inlet (entrance) part of the toner collecting unit 4 such that the charges of the toner particles T formed in the granulating unit 3 are temporarily neutralized (discharged). The charge removing unit 43 employs a soft X-ray irradiation apparatus 43A that irradiates soft X rays to the toner particles T; nevertheless, the charge removing unit 43 may employ a plasma irradiation apparatus 43B that irradiates plasma onto the toner particles T as shown in FIG. 17.

The toner particles T collected by the toner collecting unit 4 are conveyed to the toner storage unit 6 by the vortex (gas flow 42) through the tube 5, and stored in the toner storage unit 6. Here, if the toner collecting unit 4, the tube 5, and the toner storage unit 6 are made of a conductive material, it is desired that they are electrically grounded. Further, it is desired that the toner manufacturing apparatus 1 as a whole is of explosion-proof. Further, the toner manufacturing apparatus 1 may be configured such that the toner particles T are conveyed from the toner collecting unit 4 to the toner storage unit 6 by pressure; or, alternatively, by suction of the toner storage unit 6.

Next, the outline of the toner manufacturing method according to the embodiment of the present invention using the toner manufacturing apparatus 1 is described.

As described above, the toner-containing liquid 10 wherein the toner composite (at least resin and colorant) is dispersed or dissolved is supplied to the liquid channel 12 of the droplet generating apparatus 2. The drive signal of a drive frequency is applied to the electromechanical transducer 17 of the droplet generating unit 11. Then, the electromechanical transducer 17 bends and vibrates; and the thin film 16 is periodically vibrated by the bending vibration of the electromechanical transducer 17. Then, the droplets 31 of the toner-containing liquid 10 are periodically discharged from the nozzles 15 to the granulating unit 3 (refer to FIG. 1) by the vibration of the thin film 16, and the granulating unit 3 removes the solvent.

Specifically, the droplets 31 discharged to the granulating unit 3 are conveyed by the dry gas 35 that flows in the flight direction of the droplets 31 in the granulating unit 3, the solvent is removed, and the toner particles T are formed. The toner particles T formed by the granulating unit 3 are collected by the toner collecting unit 4 by the air current 42 at the down-stream, are conveyed to the toner storage unit 6 through the tube 5, and are stored in the toner storage unit 6.

Thus, since two or more nozzles 15 are formed in the droplet generating unit 11 of the droplet generating apparatus 2, a great number of droplets 31 are continuously and simultaneously discharged; accordingly, the productivity of the toner is remarkably improved. Further, since the electromechanical transducer (annular vibrating unit) 17 of the droplet generating unit 11 is in the shape of a circle, and is arranged at the perimeter of the deformable domain 16A of the thin film 16 that has the nozzles 15 adjacent to the liquid channel 12, a great amount of displacement is obtained in the vibration direction of the thin film 16. By arranging the nozzles 15 in the domain wherein the displacement is great, the droplets are stably and efficiently generated without causing the nozzles 15 to be clogged. That is, stable and efficient toner manufacturing is realized. Furthermore, it was proved that the toner particles T had the unprecedented mono-distribution of the size (diameter).

Here, according to the embodiment of the present invention, the toner-containing liquid 10 is the solution or disperse liquid wherein the toner composite containing at least resin and colorant is dissolved or dispersed, respectively, to the solvent, and the droplets are dried and solidified by the granulating unit 3 (solvent removing unit) evaporating the organic solvent contained in the droplets 31. Nevertheless, other methods are possible.

For example, the toner composite may be melted and liquefied in a heated storage to serve as the toner-containing liquid 10, droplets of the toner-containing liquid 10 are discharged, and the droplets are cooled to be solidified to form toner particles. Another example may be that the toner-containing liquid 10 includes a thermosetting material, and droplets of such toner-containing liquid are then heated to be solidified to form toner particles.

Next, the toner according to the embodiment of the present invention is described. The toner is manufactured by the manufacturing method using the toner manufacturing apparatus 1 described above. In this way, mono-distribution of the sizes (diameters) of the toner particles T is obtained.

Specifically, it is desirable that the toner particle size distribution (weight average particle diameter/number average particle diameter) range between 1.00 and 1.05. Further, it is desirable that the weight average particle diameter be between 1 and 20 μm.

The toner particles (collectively, toner) manufactured by the toner manufacturing method of the embodiment can be easily dispersed (floated) in the air by an electrostatic repulsion effect. For this reason, the toner can be conveyed to a development domain without conveyance means that are used by conventional electronic photography apparatuses. That is, the toner can be conveyed to the development domain by a feeble air current, which provides sufficient conveyance, with a simple air pump, and used for development as it is. Since the so-called "power cloud development" is carried out, wherein an image is formed with no turbulence due to an air current, a high-quality development of an electrostatic latent image is obtained. Further, the toner according to the embodiment of the present invention is suitably applicable to a conventional development system. At this time, components such as a carrier and a development sleeve are used only for conveying the toner, and are not required to provide friction charging as is the case with the conventional practice. Accordingly, the degree of freedom of material selection is greatly increased for greater durability and greater economy.

Next, the toner-containing liquid 10 (toner material) that can be used by the embodiment of the present invention is described. First, the toner-containing liquid 10 wherein a toner composite is dispersed and dissolved in a solvent is described.

Toner materials used by conventional toners for electronic photography can be used. A toner binder such as styrene acryl system resin, polyester system resin, polyol system resin, and epoxy system resin is dissolved in an organic solvent, a colorant is dispersed, and a mold lubricant is either dispersed or dissolved to obtain the toner-containing liquid 10. Droplets 31 of such toner-containing liquid 10 are generated, dried, and solidified according to the toner manufacturing method to obtain the toner. Alternatively, the materials described above are thermally fused and kneaded, the kneaded object is dissolved or dispersed in a solvent to obtain the toner-containing liquid 10, and the toner is obtained by the toner manufacturing method according to the embodiment.

[Toner Material]

The toner material includes at least resin and colorant, and includes other components, such as a carrier and wax, as required.

[Resin]

The resin can be bonding resin.

The bonding resin may be any generally used material such as a styrene system monomer, an acrylic system monomer, a vinyl polymer of a methacryl system monomer, a copolymer of the above-described monomers singly or jointly, polyester system polymer, polyol resin, phenolic resin, silicone resin, polyurethane resin, polyamide resin, fran resin, epoxy resin, xylene resin, terpene resin, coumarone indene resin, polycarbonate resin, and petroleum system resin.

The styrene system monomer includes styrene, and a derivative of the styrene such as o-methyl styrene, m-methyl styrene, p-methyl styrene, p-phenyl styrene, p-ethyl styrene, 2,4-dimethyl styrene, p-n-amyl styrene, p-tert-butyl styrene, p-n-hexyl styrene, p-n-octyl styrene, p-n-nonyl styrene, p-n-decyl styrene, p-n-dodecyl styrene, p-methoxy styrene, p-chlorostyrene, 3,4-dichloro styrene, m-nitro styrene, o-nitro styrene, and p-nitroglycerine styrene.

The acrylic system monomer includes acrylic acid, and ester of acrylic acid such as methyl acrylate, ethyl acrylate, propyl acrylate, n-butyl acrylate, iso butyl acrylate, n-octyl acrylate, n-dodecyl acrylate, 2-ethylhexyl acrylate, stearic acrylate, 2-chloroethyl acrylate, and phenyl acrylate.

The methacryl system monomer includes methacryl acid, and ester of methacryl acid such as ethyl methacrylate, propyl methacrylate, n-butyl methacrylate, iso butyl methacrylate, n-octyl methacrylate, n-dodecyl methacrylate, 2-ethylhexyl methacrylate, stearyl methacrylate, phenyl methacrylate, dimethylaminoethyl methacrylate, and diethylaminoethyl methacrylate.

Other monomers for forming the vinyl polymer, and the copolymer include:

(1) mono olefins such as ethylene, propylene, butylene, and iso butylene;

(2) polyenes such as butadiene, and isoprene;

(3) vinyl halides such as vinyl chlorides, vinylidene chloride, vinyl bromide, and vinyl fluoride;

(4) vinyl esters such as vinyl acetate, vinyl propionate, and vinyl benzoate;

(5) vinyl ethers such as vinyl methyl ether, vinyl ethyl ether, and vinyl iso butyl ether;

(6) vinyl ketones such as vinyl methyl ketone, vinyl hexyl ketone, and methyl isopropenyl ketone;

(7) N-vinyl compounds such as N-vinyl pyrrole, N-vinyl carbazole, N-vinyl indole, and N-vinyl pyrolidone;

(8) vinyl naphthalene;

(9) acrylate and methacrylate derivatives such as acrylonitrile, methacrylo nitrile, and acrylamide;

(10) unsaturated diacids such as maleic acid, citraconic acid, itaconic acid, alkenylsuccinic acid, fumaric acid, and mesaconic acid;

(11) anhydrides of the unsaturated diacid such as maleic acid anhydride, citraconic anhydride, itaconic anhydride, and alkenylsuccinic anhydride;

(12) monoesters of unsaturated diacid such as monomethyl ester maleate, monoethyl ester maleate, monobutyl ester maleate, citraconic monomethyl ester, citraconic monoethyl ester, citraconic monobutyl ester, itaconic monomethyl ester, alkenylsuccinic monomethyl ester, fumaric monomethyl ester, and mesaconic monomethyl ester;

(13) esters of unsaturated diacid such as dimethyl maleic acid, and dimethyl fumaric acid;

(14) $\alpha$, $\beta$-unsaturated acids such as croton acid, and cinnamon acid;

(15) $\alpha$,$\beta$-unsaturated anhydrides such as croton anhydride, and cinnamon anhydride;

(16) anhydrides of the $\alpha$,$\beta$-unsaturated anhydride and low-grade fatty acid, alkenyl malonic acid, alkenyl glutaric acid, alkenyl adipin acid, anhydrides of the acids, and monomer with a carboxyl base such as monoester of the anhydrides of the acids;

(17) hydroxyalkyl esters of acrylic acid and methachryl acid such as 2-hydroxyethyl acrylate, 2-hydroxymethyl acrylate, 2-hydroxypropylmethachlyrate; and

(18) monomers with a hydroxy base such as 4-(1-hydroxy-1-methylbutyl) styrene, and 4-(1-hydroxy-1-methylbutyl) styrene.

The vinyl polymer and the copolymer serving as the bonding resin of the toner according to the embodiment of the present invention may have a cross-linker whereby a bridge is formed by the cross-linker that has two or more vinyl bases. The cross-linker includes:

an aromatic divinyl compound such as divinyl benzene, and divinylnaphthalene;

a diacrylate compound connected with an alkyl chain such as ethylene glycol diacrylate, 1,3-butylene glycol diacrylate, 1,4-butane diol diacrylate, 1,5-pentane diol diacrylate, 1,6 hexandioldiacrylate, neopentyl glycol diacrylate, and the listed compounds wherein the acrylate is replaced by methacrylate; and a diacrylate compound connected with an alkyl chain including an ether combination such as diethylene glycol diacrylate, a triethylen glycol diacrylate, tetraethylene glycol diacrylate, polyethylene glycol #400 diacrylate, polyethylene glycol #600 diacrylate, dipropyrene glycol diacrylate, and the listed compounds wherein the acrylate is replaced by metha acrylate.

Further, a diacrylate compound and a dimethacrylate compound having a chain composition including an aromatic base and an ether bond may be used. Further, polyester type diacrylate such as MANDAN (made by Nippon Kayaku Co., Ltd.) may be used.

Further, a polyfunctional cross-linker may be used, such as penta erythritol triacrylate, trimethylolethane triacrylate, trimethylol propane triacrylate, tetra methylol methane tetraacrylate, oligo ester acrylate, and the listed compounds wherein the acrylate is replaced by methacrylate, triallyl cyanurate, and triaryl trimellitate.

It is desirable that the amount of the cross-linker is between 0.01 and 10 mass parts to 100 mass parts of other monomer components; and more desirable range is between 0.03 and 5 mass parts. Out of the bridging monomers, the aromatic divinyl compound (especially, divinyl benzene), and the diacrylate compounds connected with the bonding chain including an aromatic base and one ether bond are preferred in view of a fixing nature and offset-proof nature of the toner resin. Further, of these, a monomer combination that serves as a styrene system copolymer and styrene-acrylic system copolymer is desirable.

A polymerization initiator is used in manufacturing the vinyl polymer and the copolymer of the embodiment of the present invention. The polymerization initiator includes 2,2'-azobisisobutyro nitrile, 2,2'-azobis (4-methoxy-2,4-dimethylvaleronitrile), 2,2'-azobis (2,4-dimethylvaleronitrile), 2,2'-azobis (2-methylbutyronitrile), dimethyl-2,2'-azobisisobutyrate, 1,1'-azobis (1-cyclohexanecarbonitrile), 2-(carbamoylazo)-isobutyronitrile, 2,2'-azobis (2,4,4-trimethyl pentane), 2-phenylazo-2',4'-dimethyl-4'-methoxyvaleronitrile, 2,2'-azobis (2-methyl propane), ketone peroxide such as methylethylketoneperoxide, acetylacetoneperoxide, cyclohexanonketoneperoxide, 2,2-bis (tert-butylperoxy) butane, tert-butylhydroperoxide, cumene hydroperoxide, 1,1,3-tetramethylbutyl hydroperoxide, di-tert-butyl peroxide, tert-butylcumyl peroxide, di-cumyl peroxide, $\alpha$-(tert-butyl peroxy) isopropylbenzene, isobutyl peroxide, octanoyl peroxide, decanoyl peroxide, lauroyl peroxide, 3,5,5-trimethylhexanoyl peroxide, benzoyl peroxide, m-tolyl peroxide, di-isopropyl peroxy dicarbonate, di-2-ethylhexyl peroxy dicarbonate, di-n-propyl peroxy dicarbonate, di-2-ethoxyethyl peroxy carbonate, di-ethoxy isopropyl peroxy dicarbonate, di-(3-methyl-3-methoxy butyl) peroxy carbonate, acetyl cyclohexyl sulfonyl peroxide, tert-butyl peroxy acetate, tert-butylperoxyisobutylate, tert-butylperoxy-2-ethylhexylate, tert-butylperoxy laurate, tert-butyl-oxybenzoate, tert-butylperoxy isopropyl carbonate, di-tert-butyl peroxy iso phthalate, tert-butyl peroxy allyl carbonate, iso amyl peroxy-2-ethyl hexanoate, di-tert-butylperoxy hexahydro terephthalate, and tert-butylperoxy azelate.

When the bonding resin is the styrene-acrylic system resin, it is desirable that the resin has at least one peak in a domain of molecular weight between 3,000 and 50,000 (as converted into number mean molecular weight), and at least one peak in a domain of molecular weight of 100,000 or greater with reference to a molecular weight distribution by GPC of extractives of the resin into a tetrahydrofuran (THF) from the viewpoint of fixing nature, offset nature, and long-life nature. Further, it is desired that, as for the THF extractives, components of 100,000 or less molecular weight occupy 50 to 90% of the bonding resin; it is more desirable if the bonding resin has a main peak in a domain of the molecular weight between 5,000 and 30,000; and the most desirable is that the bonding resin has the main peak of molecular weight in a domain between 5,000 and 20,000.

If the bonding resin is the vinyl polymer of the styrene-acrylic system resin, it is desirable that an acid value is between 0.1 mgKOH/g and 100 mgKOH/g, more preferably between 0.1 mgKOH/g and 70 mgKOH/g, and most preferably between 0.1 mgKOH/g and 50 mgKOH/g.

Monomers that constitutes the polyester system polymer include a dihydric alcohol such as ethylene glycol, propylene glycol, 1,3-butanediol, 1,4-butanediol, 2,3-butanediol, diethylene glycol, triethylene glycol, 1,5-pentanediol, 1,6-hexanediol, neopentyl glycol, 2-ethyl-1,3hexanediol, hydrogenated bisphenol A, and diol obtained by polymerization of bisphenol A and annular ether such as ethylene oxide and propylene oxide. For bridging the polyester resin, it is desirable that multiple alcohol of 3 or greater is added.

The multiple alcohol of 3 or greater includes sorbitol, 1,2,3,6-hexanetetrol, 1,4-sorbitan, pentaerythritol, dipentaerythritol, tripentaerythritol, 1,2,4-butanetriol, 1,2,5-pentatriol, glycerol, 2-methylpropanetriol, 2-methyl-1,2,4-butanetriol, trimethylol ethane, trimethylol propane, and 1,3,5-trihydroxy benzene.

Acid components for forming the polyester system polymer include:

Benzene dicarboxylic acid and its anhydride such as phthalic acid, isophthalic acid, and terephthalic acid;

alkyl dicarboxylic acid and its anhydrides such as succinic acid, adipic acid, sebacic acid, and azelaic acid;

unsaturated diacid such as maleic acid, citraconic acid, itaconic acid, alkenyl succinic acid, fumaric acid, and mesaconic acid;

unsaturated diacid anhydride such as maleic anhydride, citraconic anhydride, itaconic anhydride, and alkenyl succinic anhydride. Further, multiple carboxy acid of 3 or greater includes trimellitic acid, pyromellitic acid, 1,2,4-benzene tricarboxylic acid, 1,2,5-benzene tricarboxylic acid, 2,5,7-naphthalene tricarboxylic acid, 1,2,4-naphthalene tricarboxylic acid, 1,2,4-butane tricarboxylic acid, 1,2,5-hexane tricarboxylic acid, 1,3-dicarboxy-2-methyl-2-ethylene carboxylic propane, tetra (methylene carboxy) methane, 1,2,7,8-octane tetra carboxylic acid, En Pol trimer acid, anhydrides and partial lower alkyl ester thereof.

When the bonding resin is a polyester system resin, it is desired that at least one peak is present in a domain of molecular weight between 3,000 and 50,000 concerning the molecular weight distribution of the THF-solvable component of the resin component. This is in view of the fixing nature and offset-proof nature of the toner. It is also desired that the molecular weight of 60-100% of the THF-solvable component is 100,000 or less, and more desirably the bonding resin have at least one peak in the domain of molecular weight between 5,000 and 20,000.

When the bonding resin is polyester resin, it is desirable that the acid value be between 0.1 mgKOH/g and 100 mgKOH/g; more desirably, between 0.1 mgKOH/g and 70 mgKOH/g; and further more desirably between 0.1 mgKOH/g and 50 mgKOH/g.

According to the embodiment of the present invention, the molecular weight distribution of the bonding resin is measured by gel permeation chromatography (GPC) that uses THF as the solvent.

At least one of the vinyl polymer component and the polyester system resin component of the bonding resin that can be used for the toner of the embodiment of the present invention may include a resin that contains a monomer component that can react to the vinyl polymer component and the polyester system resin component. The monomer that constitutes the polyester system resin component and is capable of reacting to the vinyl polymer includes unsaturated dicarboxy acid such as phthalic acid, maleic acid, citraconic acid, itaconic acid, and anhydride thereof. The monomer that constitutes the vinyl polymer component includes a monomer that has one of a carboxyl base, a monomer that has a hydroxy base, acrylate ester, and methacrylate ester.

Further, when another bonding resin is used together with the polyester system polymer and the vinyl polymer, it is desired that the acid value of 60 weight % or greater of the bonding resin is between 0.1 and 50 mgKOH/g.

According to the embodiment of the present invention, the acid value of the bonding resin component of the toner composite is obtained by the following method, and basic operations comply with JIS K-0070.

(1) A sample is treated such that external additives other than the bonding resin (polymer component) are beforehand removed; or alternatively, acid values and contents of the external additives other than the bonding resin and bridged bonding resin are beforehand calculated. The sample is then pulverized, 0.5 to 2.0 g of the sample is taken, and the weight of the sample is precisely measured. Such weight of the polymer component is expressed by W (g). For example, when measuring the acid value of the bonding resin of a toner, the acid value and content of colorant and a magnetic body, as applicable, are beforehand measured, and the acid value of the bonding resin is calculated.

(2) The sample is put into to a 300 ml beaker, a mixed-solution 150 ml of toluene/ethanol (volume ratio=4/1) is added, and the sample is dissolved to the mixed-solution.

(3) Titration is carried out by a potentiometric titration apparatus using an ethanol solution of KOH 0.1 mol/l.

(4) An amount of the KOH solution used at this time is expressed by S (ml), a blank is simultaneously measured and an amount of the KOH solution used at this time is expressed by B (ml), and the acid value is computed by the following formula, wherein f is a factor of KOH.

$$\text{Acid value (mgKOH/g)}=[(S-B)\times f\times 5.61]/W$$

It is desirable that a glass transition temperature (Tg) of the bonding resin of the toner and the composite containing the bonding resin is between 35 and 80 degrees C. from the viewpoint of the toner life; more desirably between 40 and 75 degrees C. If Tg is less than 35 degrees C., the toner tends to be degraded under a high-temperature atmosphere, and an offset tends to be generated at the time of fixing. Further, if Tg exceeds 80 degrees C., the fixing nature may be degraded.

The magnetic body that can be used by the embodiment of the present invention includes (1) magnetic ferrous oxide such as magnetite, maghemite, ferrite, and ferrous oxide containing other metal oxides, (2) metal such as iron, cobalt, and nickel; and an alloy with the metal and aluminum, cobalt, copper, lead, magnesium, tin, zinc, antimony, beryllium, bismuth, cadmium, calcium, manganese, selenium, titanium, tungsten, and vanadium, and (3) mixtures thereof.

Specific examples of the magnetic body includes $Fe_3O_4$, $\gamma\text{-}Fe_2O_3$, $ZnFe_2O_4$, $Y_3Fe_5O_{12}$, $CdFe_2O_4$, $Gd_3Fe_5O_{12}$, $CuFe_2O_4$, $PbFe_{12}O$, $NiFe_2O_4$, $NdFe_2O$, $BaFe_{12}O_{19}$, $MgFe_2O_4$, $MnFe_2O_4$, $LaFeO_3$, ferrous powder, cobalt powder, and nickel powder. The listed materials may be used either singly or in combination. Of the listed materials, fine powders of $Fe_3O_4$, and $\gamma\text{-}Fe_2O_3$ are preferred.

Further, magnetic ferrous oxide such as magnetite, maghemite, and ferrite that contain a "different" element, and blends thereof can also be used. Such "different" element includes lithium, beryllium, boron, magnesium, aluminum, silicon, phosphorus, germanium, zirconium, tin, sulfur, calcium, scandium, titanium, vanadium, chromium, manganese, cobalt, nickel, copper, zinc, and gallium. Desirable ones for the "different" element are magnesium, aluminum, silicon, phosphorus, and zirconium. The "different" element may be taken into a crystal lattice of the ferrous-oxide, may be taken into the ferrous oxide as an oxide, and may be present in the front surface as an oxide or hydroxide. It is desirable that the "different" element is contained as an oxide.

The "different" element can be taken into a particle by mixing a salt of the "different" element when producing the magnetic body, and by pH adjustment. Further, the "different" element can be deposited on the surface of a particle by adding a salt of the "different" element and by pH adjustment, or by pH adjustment after the magnetic body particle is formed. As for the amount the magnetic body used for this purpose, it is desirable that 10 to 200 mass parts of the magnetic body is used to 100 parts of the bonding resin, more preferably between 20 and 150 mass parts. As for the number average particle diameter of the magnetic body, a desired range is between 0.1 and 2 μm, and a more desirable range is between 0.1 and 0.5 μm. The number average particle diameter is acquired by measuring particles with a digitizer, and the like, where the particles are photographed by photomacrography with a transmission electron microscope.

Further, as for magnetic properties of the magnetic body, it is desired that, when 10 kOe (Orsted) is applied, the coercivity ranges between 20 and 150 Oe, the saturation magnetization ranges between 50 and 200 emu/g, and the residual magnetization ranges between 2 and 20 emu/g.

The magnetic body can be used also as colorant.

[Colorant]

Colorant for the embodiment of the present invention requires nothing special, but may be any usually available colorant such as carbon black, nigrosin dye, iron black (black synthetic oxide), naphthol yellow S, hansa yellow (10G, 5G, G), cadmium yellow, yellow ferrous oxide, ocher, chrome yellow, titanium yellow, polyazo yellow, oil yellow, hansa yellow (GR, A, RN, R), pigment yellow L, benzine yellow (G, GR), permanent yellow (NCG), Balkan fast yellow (5G, R), tartrazine lake, kinoline yellow lake, anthrazan yellow BGL, iso indolinone yellow, red ocher, minium, lead vermilion, cadmium red, cadmium mercury red, antimony vermilion, permanent-red 4R, Para Red, Fisay Red, parachloro-orthonitroaniline red, Lithol Fast Scarlet G, Brilliant Fast Scarlet, Brilliant Carmine BS, Permanent Red (F2R, F4R, FRL, FRLL and F4RH), Fast Scarlet VD, Vulcan Fast Lubin B, Brilliant Scarlet G, Lithol Lubin GX, Permanent Red F5R, Brilliant Carmine 6B, Pigment Scarlet 3B, Bordeaux 5B, Toluidine Maroon, Permanent Bordeaux F2K, Helio Bordeaux BL, Bordeaux 10B, Bon Maroon Light, Bon Maroon Medium, Eosin Lake, Rhodamine Lake B, Rhodamine Lake Y, Alizarine Lake, Thioindigo Red B, Thioindigo Maroon, Oil Red, Quinacridon Red, Pyrazolon Red, Polyazo Red, chrome vermilion, Benzidine Orange, Perinon Orange or Oil Orange, Cobalt Blue, Selulian Blue, Alkali Blue Lake, Peacock Blue Lake, Victoria Blue Lake, non-metal Phthalocyanine Blue, Phthalocyanine Blue, Fast Sky Blue, Indanthrene Blue (RS and BC), Indigo, Iron Blue, Ultramarine Blue, Anthraquinone Blue, Fast Violet B, Methyl Violet Lake, Cobalt Violet, Manganese Violet, Dioxan Violet, Anthraquinone Violet, Chrome Green, Zinc Green, chromium oxide, Pylidian, Emerald Green, Pigment Green B, Naphthol Green B, Green Gold, Acid Green Lake, Marakite Green Lake, Phthalocyanine Green or Anthraquinone Green, titanium oxide, a zinc white, Lithopone, and a mixture of the listed items.

As for the content of the colorant in the toner, 1-15 mass % is desirable, and 3-10 mass % is more desirable.

The colorant used for the toner according to the embodiment of the present invention can also be used as a masterbatch that is complex-compounded with the resin. The binder resin for manufacturing the masterbatch, or for kneading with the masterbatch includes:

the modified and non-modified polyester resin described above;

styrene and a polymer of a styrene substitution such as polystyrene, poly p-chlorostyrene, and poly vinyltoluene;

styrene system copolymers, such as styrene-p-chlorostyrene copolymer, styrene-propylene copolymer, styrene-vinyltoluene copolymer, styrene-vinyl naphthalene copolymer, styrene-methyl acrylate copolymer, styrene-ethyl acrylate copolymer, styrene-butyl acrylate copolymer, styrene-octyl acrylate copolymer, styrene-methyl methacrylate copolymer, styrene-ethyl methacrylate copolymer, styrene-butyl methacrylate copolymer, styrene-α-methyl chloro-methacrylate copolymer, styrene-acrylonitrile copolymer, styrene-vinyl methyl ketone copolymer, styrene-butadiene copolymer, styrene-isoprene copolymer, styrene-acrylonitrile-indene copolymer, styrene-maleic acid copolymer, and styrene-maleic ester copolymer;

polymethyl methacrylate, polybutyl methacrylate, polyvinyl chloride, poly acetic acid vinyl, polyethylene, polypropylene, polyester, epoxy resin, epoxy polyol resin, polyurethane, polyamide, poly vinyl butyral, poly acrylic acid resin, rosin, modified rosin, terpene resin, and aliphatic or alicyclic hydrocarbon resin, aromatic system petroleum resin, chlorination paraffin, and paraffin wax. These may be singly used, and may be used in combination of two or more of the listed items.

The masterbatch is made by mixing colorant and resin for masterbatches applying a high-shear force. At this time, an organic solvent can be used such that the interaction of the colorant and the resin may be enhanced. Further, a so-called flushing method using a wet-cake of the colorant may be used, which method does not require a drying process, wherein an aqueous paste (containing water) of the colorant is mixed and kneaded with the resin and the organic solvent, the colorant is moved to the resin, and the water (moisture) and the organic solvent are removed. For mixing and kneading, a high-shear dispersing apparatus such as a three roll mill can be suitably used.

As for the amount of the masterbatch, a desirable range is between 0.1 and 20 mass parts to 100 mass parts of the bonding resin.

Further, as for the resin for making the masterbatch, it is desirable that an acid value is 30 mgKOH/g or less, an amine value is between 1 and 100, and the colorant is dispersed; more preferably, the acid value is 20 mgKOH/g or less, the amine value is between 10 and 50, and the colorant is dispersed. If the acid value exceeds 30 mgKOH/g, the charging nature may be degraded under a high humidity environment, and the dispersed nature of the colorant is degraded. Further, if the amine value is either less than one or beyond 100, the colorant dispersal may become inadequate. Here, the acid value can be measured by a method given in JIS K0070, and the amine value can be measured by a method given in JIS K7237.

Further, it is desirable that a dispersant has a great compatibility with the bonding resin so that adequate colorant dispersal may be obtained. Desired dispersants that are commercially available include "Ajisper PB821", "Ajisper PB822" (made by Ajinomoto Fine-techno company), "Disperbyk-2001" (made by BYK Chemie GmbH), and "EFKA-4010" (made by EFKA).

It is desirable that the amount of the dispersant is between 0.1 and 10 mass % of the colorant of the toner. If the amount is less than 0.1 mass %, the colorant disperse may become inadequate. If the amount is greater than 10 mass %, the charging nature may be degraded under a high humidity environment.

It is desirable that the weight average molecular weight of the dispersant is in a range between 500 and 100000 in terms of the molecular weight of the local maximum of a main peak in the styrene conversion weight in gel permeation chromatography. More preferably, the range is between 3000 and 100000 from the viewpoint of the colorant disperse; further preferably, the range is between 5000 and 50000; and most desirably, the range is between 5000 and 30000. If the molecular weight is less than 500, a polarity becomes high, causing the dispersal of the colorant to be degraded. If the molecular weight exceeds 100000, affinity to the solvent may become high and the dispersal of the colorant is degraded.

It is desirable that the amount of the dispersant is in a range between 1 and 200 mass parts to 100 mass parts of the colorant; the more desirable range is between 5 and 80 mass parts. If the amount is less than 1 mass part, dispersal ability may be reduced. If the amount exceeds 200 mass parts, charging nature may be degraded.

[Other Components]

<Carrier>

The toner according to the embodiment of the present invention may be mixed with a carrier to serve as a 2-component developer. The carrier may be an ordinarily available material such as ferrite, magnetite, and a resin coated carrier.

The resin coated carrier includes a carrier core particle, and a covering material that is made of resin for covering (coating) the carrier core particle.

The resin used for the covering material includes:

styrene-acrylic system resin such as styrene-acrylate ester copolymer, and a styrene-methacrylate ester copolymer;

acrylic system resin such as acrylate ester copolymer, and methacrylate ester copolymer;

fluorine content resin such as poly tetrafluoroethylene, monochlorotrifluoro ethylene polymer, and poly vinylidene fluoride;

silicone resin, polyester resin, polyamide resin, poly vinyl butyral, and amino acrylate resin. In addition, the resin for covering (coating) the carrier may be such as ionomer resin, and poly phenylene sulfide resin. The resins listed above may be used either singly or combined. Further, a binder type carrier core wherein magnetic powder is dispersed in a resin may be used.

The resin coated carrier can be made by applying either a solution or a suspension of resin in a solvent to the carrier core, or alternatively, by mixing the carrier core and the resin as powder.

It is desired that the amount of the resin covering material is between 0.01 and 5 mass % of the resin coated carrier, and more desirably, between 0.1 and 1 mass %.

Examples of the covering (coating) material wherein two or more materials are mixed for covering the carrier include (1) 100 mass parts of titanium-oxide fine powder processed with 12 mass parts of a mixture of dimethyl dichloro silane and dimethyl silicone oil (mass ratio 1:5), and (2) 100 mass parts of silica fine powder processed with 20 mass parts of a mixture of dimethyl dichloro silane and dimethyl silicone oil (mass ratio 1:5).

Of the resins described above, the silicone resin, the styrene-methacrylate methyl copolymer, and a mixture of the fluoro-containing resin and the styrene system copolymer are preferred; especially, the silicone resin is preferred. The mixture of the fluoro-containing resin and the styrene system copolymer includes:

a mixture of poly vinylidene fluoride and styrene-methacrylate methyl copolymer;

a mixture of poly tetra fluoro ethylene and styrene-methacrylate methyl copolymer; and a mixture of vinylidenefluoride-tetrafluoroethylene copolymerization (copolymerization mass ratio is between 10:90 and 90:10), styrene-2-Ethylhexyl acrylate copolymer (copolymerization mass ratio is between 10:90 and 90:10), and styrene-2-ethylhexyl acrylate-methyl methacrylate copolymer (copolymerization mass ratio is 20-60:5-30:10-50).

The silicone resin may be a modified silicone resin generated by a silicone resin reacting to nitrogen-containing silicone resin and nitrogen-containing silane coupling agent.

A magnetic material for the carrier core includes oxides such as ferrite, overiron ferrite, magnetite, and γ-ferrous oxide; metals such as iron, cobalt, and nickel; and an alloy of the metals described above.

Further, elements contained in the magnetic material may be, for example, iron, cobalt, nickel, aluminum, copper, lead, magnesium, tin, zinc, antimony, beryllium, bismuth, calcium, manganese, selenium, titanium, tungsten, and vanadium. Of these, a copper-zinc-iron system ferrite (containing copper, zinc, and iron as main components), and a manganese-magnesium-iron system ferrite (containing manganese, magnesium, and iron as main components) are preferred.

It is desired that the resistance of the carrier be made into $10^6$-$10^{10}$ Ω·cm by adjusting the degree of roughness/smoothness of the surface of the carrier, and by adjusting the amount of the covering resin.

The particle diameter of the carrier may be between 4 and 200 μm, desirably between 10 and 150 μm, and more desirably between 20 and 100 μm. Especially, as for the resin coated carrier, it is desirable that 50% of the particles have a diameter between 20 and 70 μm.

In the case of a 2-component system developer, it is desirable that the amount of the toner according to the embodiment ranges between 1 and 200 mass parts to 100 mass parts of the carrier; more preferably, the range is between 2 and 50.

<Wax>

Further, according to the embodiment of the present invention, wax can be included in addition to the bonding resin and colorant.

No special requirements apply to the wax, and ordinarily available wax may be used; for example, aliphatic hydrocarbon system wax such as low molecular-weight polyethylene, low molecular-weight polypropylene, poly olefin wax, microcrystalline wax, paraffin wax, and sasol wax; oxide of the aliphatic hydrocarbon system wax such as oxidized polyethylene wax, and block copolymers thereof; plant system wax such as candelilla wax, carnauba wax, Japan wax (vegetable tallow), and jojoba wax; animal system wax such as bees wax, lanolin, and whale wax; mineral system wax such as ozokerite, ceresin, and petrolatum; wax of fatty acid ester such as montanic acid ester wax, and castor wax; partially or totally deoxidized fatty acid ester such as deoxidized carnauba wax.

Examples of the wax further include saturated straight-chain fatty acids such as palmitic acid, stearic acid, montanic acid and also straight-chain alkylcarboxylic acids having a straight-chain alkyl group; unsaturated fatty acids such as brassidic acid, eleostearic acid, and parinaric acid; saturated alcohols such as stearyl alcohol, eicosyl alcohol, behenyl alcohol, carnaubyl alcohol, ceryl alcohol, melissyl alcohol, and also long-chain alkyl alcohol; polyhydric alcohols such as sorbitol; fatty acid amides such as linolic acid amide, oleic acid amide and lauric acid amide; saturated fatty acid bisamides such as methylenebis capric acid amide, ethylenebis lauric acid amide, and hexamethylenebis stearic acid amide; unsaturated fatty acid amides such as ethylenebis oleic acid amide, hexamethylenebis oleic acid amide, N,N'-dioleyladipic acid amide, and N,N'-dioleylsebacic acid amide; aromatic bisamides such as m-xylenebis stearic acid amide, and N,N'-distearylisophthalic acid amide; fatty acid metal salts such as calcium stearate, calcium laurate, zinc stearate, and magnesium stearate; waxes obtained by grafting vinyl monomers such as styrene and acrylic acid to fatty acid hydrocarbon waxes; partially esterified products of polyhydric alcohols with fatty acids such as monoglyceride behenate; and methyl esterified compounds having a hydroxyl group obtained by hydrogenation of vegetable fats and oils.

Preferred examples of the wax are poly olefin that is radical-polymerized olefin under high pressure, poly olefin that is obtained when purifying a low molecular-weight byproduct generated when polymerizing a high molecular-weight poly olefin, poly olefin that is polymerized using a catalyst such as a Ziegler catalyst and a metallocene catalyst under low pressure, poly olefin polymerized by a radiation, an electromagnetic wave, or a light, low molecular-weight poly olefin obtained by thermal decomposition of a polymer of poly olefin, paraffin wax, microcrystalline wax, Fischer-Tropsch wax, synthetic hydrocarbon wax produced by a Synthol method, a Hydrocol method, an Arge method, and the like, synthetic wax wherein a monomer is a compound the carbon number of which compound is one, hydrocarbon system wax that has a functional group such as a hydroxyl group, and a carboxyl group, a mixture of the hydrocarbon system wax and the hydrocarbon system wax that has a functional group, and graft-modified wax that is one of the above described waxes graft-modified by a vinyl monomer such as styrene, maleate ester, acrylate, methacrylate, and anhydrous maleatic acid.

Further, it is desirable that the molecular weight distribution of the waxes is sharpened (small variances) by a method such as a press perspiring method, a solvent method, a recrystallizing method, a vacuum-distillation method, a super-criticality gas extracting method, and a solution crystallization method. It is also desirable that the waxes are purified by removing low molecular-weight solid fatty acid, low molecular-weight solid alcohol, low molecular-weight solid compounds, and other impurities.

It is desired that the fusing point of the wax is between 70 and 140 degrees C., and more preferably between 70 and 120 degrees C. from the viewpoint of balancing the fixing nature and offset-proof nature. If the fusing point is less than 70 degrees C., blocking-proof nature tends to be degraded. If the fusing point is greater than 140 degrees C., the offset-proof nature may be degraded.

Further, by combining different kinds of the waxes, both a plasticization nature and a demolding nature can be obtained.

Waxes that have the plasticization nature include a low fusing point wax, and a wax that has a branch and a polar base in its molecular configuration.

Waxes that have the demolding nature include a high fusing point wax that has a straight chain configuration with no polar and no functional group. Accordingly, an example of combining different waxes is a combination of the poly olefin and a graft-modified poly olefin; and a combination of waxes, fusing points of which waxes are different by a range between 10 and 100 degrees C.

When two kinds of wax that have similar configuration are chosen, a wax that has a relatively low fusing point demonstrates the plasticization nature, and the other demonstrates the demolding nature. In this case, if the difference of the fusing points is between 10 and 100 degrees C., functional separation is effectively demonstrated. If the difference is less than 10 degrees C., the functional separation effectiveness may not be easily obtained. If the difference is greater than 100 degrees C., emphasis of the function by the interaction may be hard to obtain. Accordingly, from the viewpoint of the functional separation effectiveness, it is desirable that the fusing point of at least one wax is between 70 and 120 degrees C., more desirably between 70 and 100 degrees C.

Waxes that have a branching structure, that have a polar base like a functional group, and that are modified by a component different from the main component tend to demonstrate plasticity. Conversely, waxes that have a straight chain structure, that have no polar base with a functional group, and that are not modified tend to demonstrate a demolding nature. Accordingly, preferred combinations include:

a combination of polyethylene homopolymer or copolymer wherein ethylene is the main material, and poly olefin homopolymer or copolymer wherein olefins other than ethylene is the main material;

a combination of poly olefin and graft-modified poly olefin;

a combination of alcoholic wax, fatty acid wax or ester wax, and hydrocarbon system wax;

a combination of Fischer-Tropsch wax or poly olefin wax, and paraffin wax or microcrystalline wax;

a combination of Fischer-Tropsch wax and poly olefin wax;

a combination of paraffin wax and micro crystalline wax; and a combination of carnauba wax, candelilla wax, rice wax, or montan wax, and hydrocarbon system wax.

From the viewpoint of balancing between toner service life and fixing nature, it is desired that a peak temperature of the greatest peak of an endoergic peak observed in a DSC measurement of a toner is between 70 and 110 degrees C., and more preferably between 70 and 110 degrees C.

It is desired that the total content of the wax is between 0.2 and 20 mass parts to 100 mass parts of the bonding resin, more preferably between 0.5 and 10 mass parts.

In the embodiment of the present invention, the fusing point of a wax is the temperature of the peak of the greatest peak of the endoergic peak of the wax measured by DSC.

For the DSC measurement of the wax and the toner, it is desirable that an inner heat input compensation type high-precision differential scanning calorimeter is used. The measurement is conducted according to ASTM D3418-82. The embodiment uses a measuring result of a DSC curve that is obtained by first taking a hysteresis by raising the temperature, then reducing the temperature; and then the temperature is raised at a speed of 10 degrees C. per minute to obtain the measuring result.

<A Fluid Improver>

A fluid improver may be added to the toner according to the embodiment of the present invention. The fluid improver is added to the surface of toner particles for improving fluidity (ease of flowing) of the toner.

The fluid improver may be, for example, carbon black, fluorine system resin powder such as fluoridated vinylidene fines, and poly tetra fluoro ethylene fines; processed silica, processed titanium oxide, and processed alumina that are made of silica fines such as wet process silica; and dry process silica, titanium oxide fines, alumina fines by surface treatment with silane coupling agent, titanium coupling agent, and silicone oil.

The fluid improver is desirably the silica fines, the titanium oxide fines, and the alumina fines. Further, the more desired are the processed silica that is made of the silica fines, the titanium oxide fines, and the alumina fines that are surface-treated with one of the silane coupling agent and the silicone oil.

It is desired that an average diameter of primary particles of the fluid improver is between 0.001 and 2 μm, more desirably between 0.002 and 0.2 μm.

The silica fines are generated by gas-phase oxidization of a compound of silicon and halogen, and are called dry process silica or fumed silica.

Commercially available silica fines produced by the gas-phase oxidization of the compound of silicon and halogen include:

AEROSIL (made by Japan Aerosil company)-130, -300, -380, -TT600, -MOX170, -MOX80, and -COK84;

Ca-O-SiL (made by CABOT)-M-5, -MS-7, -MS-75, -HS-5, and -EH-5;

Wacker HDK-N20 V15, -N20E, -T30, and -T40 (made by WACKER-CHEMIE);

D-CFineSilica (made by Dow Corning); and

Fransol (made by Fransil).

Further, the processed silica fines are more preferred, which fines are produced by hydrophobizing silica fines generated by gas-phase oxidization of a silicon halogen compound. The degree of hydrophobizing of the processed silica fines measured by a methanol titration examination is desired to be between 30 and 80%. Hydrophobizing of the silica fines is carried out either chemically or physically with an organic silicon compound that reacts to and is physically adsorbed by the silica fines. A preferred process is that the silica fines are processed with the organic silicon compound.

The organic silicon compound may be, for example, hydroxy-propyl-trimethoxysilane, phenyltrimethoxysilane, n-hexadecyl trimethoxy silane, n-octadecyl trimethoxy silane, vinyl methoxy silane, vinyl triethoxy silane, vinyl triacetoxy silane, dimethylvinyl chloro silane, divinylchloro silane, γ-methacryloxy propyl trimethoxy silane, hexamethyl disilane, trimethyl silane, trimethyl chloro silane, dimethyl dichloro silane, methyl trichloro silane, allyl dimethyl chloro silane, allyl phenyl dichloro silane, benzyl dimethyl chloro silane, bromo methyl dimethyl chloro silane, α-chloro ethyl trichloro silane, β-chloro ethyl trichloro silane, chloromethyl dimethyl chloro silane, triorganosilyl mercaptan, trimethylsilyl mercaptan, triorganosilyl acrylate, vinyldimethyl acetoxy silane, dimethyl ethoxy silane, trimethyl ethoxy silane, trimethyl methoxysilane, methyl triethoxy silane, iso-butyl trimethoxy silane, dimethyl dimethoxy silane, diphenyl-diethoxy silane, hexamethyl disiloxane, 1,3-divinyl tetramethyl disiloxane, 1,3-diphenyl tetra methyl disiloxane, and dimethyl poly siloxane that has 2-12 siloxane units per molecule, and terminal units containing 0-1 hydroxyl group combined with Si. Furthermore, silicone oil such as dimethyl silicone oil may be used. The materials described above may be used either singly or combined.

It is desired that the number average particle diameter of the fluid improver be between 5 and 100 nm, and more preferably between 5 and 50 nm.

It is desired that the specific surface of the fluid improver be greater than 30 m$^2$/g, and more preferably between 60 and 400 m$^2$/g. The specific surface is measured by nitrogen adsorption using a BET method. As for the fines, the surfaces of which are processed, the desired range is greater than 20 m$^2$/g, and more preferably between 40 and 300 m$^2$/g.

It is desired that the amount of the fines range between 0.03 and 8 mass parts to 100 mass parts of the toner particles.

Other external additives may be added to the toner according to the embodiment of the present invention so that improvements may be obtained in the following fields; namely, protection of electrostatic latent-image supporting object and the carrier, cleaning nature, adjustments of a heat characteristic, an electrical property, a physical characteristic, adjustment of a resistance, adjustment of softening-point, rate of fixing, etc. Such external additives include various metallic soaps, a fluorine system surface active agent, dioctyl phthalate, and electric conductive agents. The electric conductive agents include inorganic powders such as tin oxide, zinc oxide, carbon black, antimony oxide, titanium oxide, aluminum oxide, and alumina. The inorganic powers may be hydrophobized if needed. Further, a small amount of the following materials may be added: lubricant materials, such as poly tetra fluoro ethylene, zinc stearate, and poly fluoridation vinylidene; abrading agents such as cesium oxide, silicon carbide, and strontium titanate; a caking repellent; and a development improver that is a mixture of black and white particles, the polarity of which particles is opposite to the toner particles. It is desirable that the external additives be processed with silicone varnish, various modified silicone varnishes, silicone oil, various modified silicone oils, a silane coupling agent, a silane coupling agent that has a functional group, other organic compounds of silicon, and other processing materials so that the amount of charging may be controlled.

When preparing the developer, the inorganic particles such as the above-described hydrophobic silica fines may be added and mixed so that the fluidity, life, development nature, and the transfer nature of the developer are improved. When mixing the external additive, an ordinary mixer can be used; however, it is desirable that the mixer includes a jacket so that an internal temperature can be adjusted. For changing the hysteresis of a load due to the additive, the external additive can be gradually added, and the rotational speed of a mixer, a rolling speed, time, temperature, etc., may be changed; it is also possible to give a great load in the beginning and a small load afterwards, or conversely, a small load in the beginning and a great load afterward.

Examples of the mixer that can be used include a V-type mixer, a rocking mixer, a Loedige mixer, a Nauter mixer, and a Henschel mixer.

As for a method of further adjusting the shape of the obtained toner particles, there is no special limitation, and a suitable method can be employed according to the purpose. Examples are: (1) a method wherein the toner material including the bonding resin and colorant are melted and kneaded, then pulverized, and the shape is mechanically adjusted with a hybridizer, or using a mechano-fusion process; (2) a so-called spray-drying method wherein the toner material is dissolved/dispersed in a solvent that is capable of dissolving the toner binder, the solvent is removed by a spray dry apparatus, and the toner particles are obtained; and (3) a method of heating in a aquatic medium and the toner particles are obtained.

As the external additive, inorganic particles can be preferably used.

The inorganic particles include silica, alumina, titanium oxide, barium titanate, magnesium titanate, calcium titanate, strontium titanate, zinc oxide, tin oxide, silica, clay, mica, wollastonite diatom earth, chromium oxide, cerium oxide, colcothar, antimony trioxide, magnesium oxide, zirconium oxide, barium sulfate, barium carbonate, calcium carbonate, silicon carbide, and silicon nitride.

It is desired that the diameter of the primary particles of the inorganic particles is between 5 nm and 2 μm, more preferably between 5 nm and 500 nm.

It is desirable that the specific surface measured by the BET method is between 20 and 500 m$^2$/g.

It is desirable that the amount of the inorganic particles is between 0.01 and 5 mass % of the toner, and more preferably between 0.01 and 2.0 mass %.

In addition, polymer particles such as polystyrene, methacrylate ester and the acrylate ester copolymer obtained by soap free emulsion polymerization, suspension polymerization, and dispersed polymerization; silicone, benzoguanamine, and nylon obtained by polycondensation; and a thermosetting resin may be used as the external additives.

Degradation of the external additives described above under high humidity can be reduced by raising a hydrophobic property with a surface treatment agent.

{For this the following surface treatment agents may be suitably used; namely, a silane coupling agent, a silylation agent, a silane coupling agent that has alkyl fluoride, an organic titanate system coupling agent, a coupling agent of an aluminum system, a silicone oil, a modified silicone oil, and the like.

It is desired that the diameter of the primary particles of the inorganic particles is between 5 nm and 2 μm, and more preferably between 5 nm and 500 nm. Further, it is desired that the specific surface measured by the BET method be between 20 and 500 m$^2$/g. It is desired that the amount of the inorganic particles be between 0.01 and 5 weight % of the toner, and more desirably between 0.01 and 2.0 weight %.

A cleaning agent for removing the developer that remains on the electrostatic latent image supporting object and a primary transfer medium after image transfer may be, for example, zinc stearate, calcium stearate, and metal salt of fatty acid such as stearic acid; and polymer particles manufactured by soap free emulsion polymerization such as poly methyl methacrylate particles, and polystyrene particles. It is desired that the polymer particles have comparatively small particle size distribution, and that a volume mean particle diameter is between 0.01 and 1 μm.

Although the toner according to the embodiment of the present invention can be applied to developing with all conventional electrostatic latent-image supporting objects, preferred ones include organic electrostatic latent-image supporting objects, amorphous silica electrostatic latent-image supporting objects, selenium electrostatic latent-image supporting objects, and zinc oxide electrostatic latent-image supporting objects.

Next, the toner-containing liquid 10 that is cooled for solidification by the granulating unit (granulating process) is described.

It is desirable that toner composite that is thermally melted and then cooled for solidification mainly includes the following material that can be melted to obtain a low viscosity solution.

Namely, one or a combination of monoamine, bus amide, tetra amide, polyamide, ester amide, polyester, poly vinyl acetate, polymer of acrylate system and methacrylate system, styrene system polymer, ethylene vinyl acetate copolymer, poly ketone, silicone, coumarone, fatty acid ester, tri glycoside, a natural resin, natural wax, and synthetic wax.

The polyamides include VERSAMID 711, VERSAMID 725, VERSAMID 930, VERSAMID 940, VERSALON 1117, VERSALON 1138, VERSALON 1300 (made by Henkel), TOHMIDE 391, TOHMIDE 393, TOHMIDE 394, TOHMIDE 395, TOHMIDE 397, TOHMIDE 509, TOHMIDE 535, TOHMIDE 558, TOHMIDE 560, TOHMIDE 1310, TOHMIDE 1396, TOHMIDE 90, and TOHMIDE 92 (made by Fuji Chemicals). The polyester includes KTR2150 (made by Kao). The poly vinyl acetate includes AC401, AC540, and AC580 (made by Allied Chemical). The silicone includes silicone SH6018 (made by Toray Silicone), silicone KR215, silicone KR216, and silicone KR220 (made by Shin-etsu Silicone). The cuormane includes Escron G-90 (made by Nippon Steel Chemical).

The fatty acid may be one or a combination of the following materials; namely, stearic acid, arachin acid, behenic acid, lignoceric acid, cerotic acid, montanic acid, melissic acid, and the like, and esters thereof.

The fatty acid amides include lauric amide, stearic amide, oleic amide, erucic amide, ricinoleic amide, stearic ester amide, palmitic amide, behenic amide, and brassidic amide; N-substituted fatty acid amide includes N,N'-2-hydroxy stearic amide, N,N'-ethylene bis oleic amide, N,N'-xylene bis stearic amide, stearic acid monomethylol amide, N-oleyl stearic amide, N-stearyl stearic amide, N-oleyl palmitic amide, N-stearyl erucic amide, N,N'-dioleyl adipic amide, N,N'-dioleyl sebacic amide, N,N'-distearyl isophthalic amide, and 2-stearamide ethyl stearate. The materials may be used either singly or combined.

As the fatty acid ester, monohydroxy or multiple alcoholic fatty acid ester is desirable. For example, sorbitan mono palmitate, sorbitan mono stearate, sorbitan mono behenate, polyethylene glycol mono stearate, polyethylene glycol distearate, propylene glycol mono stearate, and ethylene glycol distearate are desired.

Specifically, commercial products include Leodol SP-S10, Leodol SP-S30, Leodol SA 10, Emazol P-10, Emazol S-10, Emazol S-20, EmazolB, Leodol super SP-S10, Emanon 3199, Emanon 3299, and Exceparl PE-MS (made by Kao).

Further, fatty acid ester of glycerin is more desirable, which includes stearic acid monoglyceride, palmitic acid monoglyceride, oleic acid monoglyceride, and behemic acid monoglyceride. Commercial products include Leodol MS-50, Leodol MS-60, Leodol MS-165, Leodol MO-60, Exceparl G-MB (made by Kao), Carnauba Wax (deodorized and purified) No. 1, Candililla Wax (purified) No. 1 (made by Noda wax (Cerarica Noda)), Syncro Wax-ERL-C, Syncro Wax HR-C (made by Croda), and KF2 (made by Kawaken Fine Chemicals). Further, special ester system wax such as Exceparl DS-C2 (made by Kao), Kawaslip-L, and Kawaslip-R (made by Kawaken Fine Chemicals) may be used. Further, higher-alcohol ester of higher fatty acid may be used, which includes myricyl cerotate, ceryl cerotate, ceryl montanate, myricyl palmitate, myricyl stearate, cetyl palmitate, and cetyl stearate.

Here, an alkyl group is present in both fatty acid and alcohol. The fatty acid ester can be used either singly or combined. The fatty acid ester has a low melt viscosity, the fluidity at the time of ink melting is stable, flexibility is high, and surface-protection force is great compared with a carbon-carbon bond; for this reason, a printed image can be bent without damages. It is desirable that the fatty acid ester can be easily pressure-processed having a penetration (a degree of penetration) greater than 1. Further, it is desired that the viscosity at the time of injection is less than 20 mPa·s.

Polyamide is generally divided into aromatic polyamide and dimer acid polyamide. According to the embodiment of the present invention, the dimer acid based polyamide is desirable. Further, it is desired that the acid that serves as the base is oleic acid, linoleic acid, linoleic acid, or eleo-stearic acid. Specifically, the following products may be used, namely, Macromelt 6030, Macromelt 6065, Macromelt 6071, Macromelt 6212, Macromelt 6217, Macromelt 6224, Macromelt 6228, Macromelt 238, Macromelt 6239, Macromelt 6240, Macromelt 6301, Macromelt 6900, DPX 335-10, DPX H-415, DPX 335-11, DPX 830, DPX 850, DPX 925, and DPX 927. DPX 1160, DPX 1163, DPX 1175, DPX 1196, DPX 1358 (made by Henkel Hakusui), SYLVAMIDE-5 (made by Arizona Chemical), UNIREZ 2224, and UNIREZ 2970 (made by Union Camp).

The glyceride may be one or a combination of rosin ester, lanolin ester, hydrogenated caster oil, partially hydrogenated caster oil, highly hydrogenated soybean oil, and highly hydrogenated rapeseed oil, and highly hydrogenated vegetable oil.

As for the wax systems, preferred ones include petroleum system wax such as paraffin wax, and micro crystalline wax, vegetable system wax such as candelilla wax, and carnauba wax, higher fatty acid and higher alcohol such as polyethylene wax, hydrogenate caster oil, stearic acid, and behenic acid, ketone such as such as stearon, and lauron.

Especially, fatty acid ester amides, saturated or unsaturated fatty acid amides, and fatty acid esters are desirable.

Furthermore, any combination of a fatty acid, fatty acid amide, glyceride, wax, and others can be used so long that such combination is adaptable to an ink component.

In addition, the colorant and the like are as described above.

For kneading and dispersing the components described above, various kinds of well-known pulverization and dispersing apparatuses can be used without special limitations. Such apparatuses can be classified into high-speed tumbling mills, roller mills, container drive media mills, media agitating mills, and jet mills; they may be classified into cylinder rotating mills, vibrating ball mill, centrifugal ball mills, media agitating mills, and colloid mills. Such apparatuses include a cutter mill, a cage mill, a hammer mill, a centrifugal classification mill, a stamp mill, a fret mill, a centrifugal mill, a ball bearing mill, a ring rolling mill, a table mill, a rotational ball mill, a tube mill, a conical mill, a tricone mill, a pot mill, a cascade mill, a centrifugal fluid mill, annular mill, a high speed disperser, an impeller disperser, a gate mixer, a bead mill, a sand mill, a pearl mill, a cobra mill, a pin mill, a Molyneux mill, an agitating mill, a universal mill, a Century mill, a pressure mill, an agitator mill, a 2-roll extruder, a 2-roll mill, a 3-roll mill, a "niche" mill, a kneader, a mixer, a stone mill, a KD series Dyno mill, a planetary mill, a vibrating mill, an annular mill, an agitation mill with an agitation tub, a vertical circulation tubing agitation mill, a ball mill, a paddle mixer, a tower mill, an attritor, a centri mill, a sand grinder, a grain mill, an attrition mill, a planetary mill, a vibrating mill, a flow jet mixer, a slasher mill, a peg mill, a micro fluidizer, a clearmix, a Rhino mill, a homogenizer, a bead mill with a pin, a horizontal-type bead mill, a pin mill, and a majack mill.

The toner-containing liquid 10 that is produced by kneading, milling, and dispersing the toner material with the kneading/dispersing apparatus described above may be introduced into the liquid channel 12 under dissolution so that the droplets 31 may be breathed out from the nozzles 15 of the droplet generating unit 11. Alternatively, the toner-containing liquid 10 may be cooled, solidified, roughly ground, and stored; then, the ground object is introduced to the liquid channel 12 for thermally melting, and breathed out as the droplets 31 from the nozzles 15 of the droplet generating unit 11.

Next, the case wherein the toner-containing liquid 10 contains radiation hardening matter is described. Optical irradiation is carried out to the toner-containing liquid 10 such that a hardening reaction is carried out, and particles are produced.

The radiation hardening matter includes a radiation sensitive resin and radiation hardening resin such as cyclized poly isoprene, cyclized polybutadiene, poly (meta) acrylate ester of poly ether, cinnamate ester of poly vinyl alcohol, novolac resin, poly methacrylate glycidyl, and chlorination poly methyl styrene.

The radiation hardening matter is diluted with a solvent or a polymerizable monomer, and an irradiation cross-linker or an irradiation polymerization initiator is added. The polymerizable monomer includes vinyl aromatic monomers such as styrene, α-methyl styrene, vinyltoluene, chloro styrene, and divinyl benzene; acrylic system monomers such as (meta) acrylic acid, (meta) methyl acrylate, (meta) n-butyl acrylate, (meta) hydroxy ethyl acrylate, ethylene glycol di (meta) acrylate ester, and (meta) acrylonitrile; vinyl ester system monomers such as formic acid vinyl, and acetic acid vinyl; vinyl halide system monomers such as vinyl chloride, and chlorination vinylidene; diallyl phthalate, and a triallyl cyanurate.

The polymerizable monomers may be used either singly or combined. It is desirable that the amount of the styrene, (meta) acrylate ester, and divinyl benzene be between 0.05 and 3 weight parts to 100 weight parts of the toner-containing liquid 10 in view of preventing an offset phenomenon while maintaining a fixing nature.

The irradiation cross-linker and the irradiation polymerization initiator include azide compounds such as aromatic azide, and trichloromethyl triazide; halogenation silver halide, bis imidazole derivative, cyanine coloring matter, and keto coumarin coloring matter. Further, azo system radical polymerization initiators such as follows may be used, namely, azo-bis isobutylonitrile, and azobis valero nitrile.

As described, the droplets 31 of the toner-containing liquid 10 containing the radiation hardening matter are hardened while the droplets 31 are floating by irradiation of a light. It is desired that the wavelength of the light be between the ultraviolet and 480 nm; more preferably between 250 and 410 nm. The light is available from a high-pressure or low-pressure mercury vapor lamp. The energy required for hardening is desired to be between several $mJ/cm^2$ to several $J/cm^2$.

Next, specific examples of the embodiment of the present invention are described. Nevertheless, the present invention is not limited to the following examples at all.

Example 1

—Manufacturing Colorant Disperse Liquid—

First, a disperse liquid of carbon black as colorant was prepared.

Specifically, 17 mass part of carbon black (Regal400 made by Cabot), and 3 mass part of a dispersing agent were mixed into 80 mass part of ethyl acetate, and were mixed with a mixer that had an agitating blade; and a primary disperse liquid was obtained. The dispersing agent was Ajisper PB821 (made by Ajinomoto Fine-Techno). Powerful shear force using a Dyno mill was applied to the obtained primary disperse liquid so that all aggregates measuring 5 μm or greater were removed, and a secondary disperse liquid was obtained.

—Manufacturing Wax Disperse Liquid—

Next, a wax disperse liquid was prepared.

Specifically, 18 mass part of carnauba wax and 2 mass part of a wax dispersant were mixed into 80 mass part of ethyl acetate, and were mixed with a mixer that had an agitating blade; and a primary disperse liquid was obtained. The primary disperse liquid was stirred and warmed to 80 degrees C., then carnauba wax was dissolved, then the temperature was reduced to the room temperature, and wax particles were deposited. Here, the diameters of the wax particles were 3 μm or less. The wax dispersant was polyethylene wax, to which styrene-acrylate butyl copolymer was grafted. Then, powerful shear force was applied to the primary disperse liquid by the Dyno mill such that the greatest diameter of the wax particles became 2 μm or less.

—Manufacturing Toner Containing Disperse Liquid—

Next, the toner-containing liquid 10 that contains a bonding resin, the colorant disperse liquid, and the wax disperse liquid was prepared as follows.

Specifically, 100 mass part of polyester resin serving as the bonding resin, 30 mass part of the colorant disperse liquid, 30 mass part of the wax disperse liquid, and 840 mass part of ethyl acetate were mixed with a mixer that had an agitating blade for 10 minutes such that the materials were uniformly dispersed. No aggregate of the wax or paint particles was generated by a shock due to solvent dilution. The electrical conductivity of the disperse liquid was $1.8 \times 10^{-7}$ S/m.

—Production of Toner—

The toner-containing liquid 10 (the disperse liquid obtained above) was supplied to the nozzles 15 of the droplet generating unit 11 of the toner manufacturing apparatus 1. The thin film 16 (nozzle plate) was made of a nickel plate that was 20 μm thick and 8.0 mm in diameter; the nozzles 15 (discharging holes) were formed by an electroforming process of the thin film 16; each discharging hole was shaped like a circle having a diameter of 10 μm; the nozzles 15 were prepared only in an area of about 5 mmφ at the center of the thin film 16; the nozzles 15 were formed at an interval of 100 μm in the shape of a hound's-tooth check. The effective number of the nozzles 15 (discharging holes) was calculated to be about 1000.

The droplets 31 of the toner-containing liquid 10 (the disperse liquid that was prepared as described above) were dried and solidified to become toner particles under toner producing conditions described below. Since the toner particles were charged when they were breathed out, and tended to be adhered to a wall surface with the static electricity, toner collection effectiveness could be degraded; accordingly, the charge was removed with a soft X-ray irradiation before collecting the toner particles. As a soft X-ray irradiation apparatus 43A, an explosion-proof photo ionizer (L9499; made by Hamamatsu Photonics) was used. With this arrangement, no toner particles were adhered to the wall.

—Evaluation of the Thin Film 16—

<Measurement of Vibration Displacement>

Displacement due to the vibration of the thin film 16, in which the nozzles 15 were formed, was measured using a laser-Doppler vibration meter (made by Graphtec Corp.). A laser beam is condensed to the thin film 16 through a microscope lens. Then, a reflected light is electrically detected by a photodiode with a coaxial optical system, and a vibration speed was computed based on the Doppler effect. The amount of the displacement due to the vibration was calculated by an integration of the vibration speed. Signals were taken in with an oscilloscope (made by Tektronik), and were stored in a personal computer (PC).

[Toner Producing Conditions]

Specific gravity of the disperse liquid: $\rho = 1.1888$ g/cm$^3$
Dry air flow: dry nitrogen in the apparatus: 30.0 L/min.
Temperature in the apparatus: 27-28 degrees C.
Dew point temperature: −20 degrees C.
Nozzle vibration frequency: 98 kHz
Peak of applied sign wave voltage: 20.0 V Here, the nozzle vibration frequency is the vibration frequency of the thin film 16. In addition, pressure applied to the toner-containing liquid 10 was determined to be about 20 kPa by a calculation based on a result of measuring the displacement. Under the conditions described above, the toner-containing liquid 10 was smoothly discharged with no clogging.

The toner particles were discharged by the soft X-ray irradiation, and were collected by a filter that had 1 μm holes. Particle size distribution of the collected particles was measured with a Flow-type Particle Image Analyzer (FPIA-2000; made by SYSMEX) under measurement conditions described below; it was determined that weight average particle diameter (D4) was 5.2 μm, and number average particle diameter (Dn) was 4.9 μm; that is, the toner particles of D4/Dn=1.06 were obtained. FIG. 14 is a scanning-electron-microscope photography of the toner particles.

—Evaluation of Toner—

The obtained toner was evaluated as follows. Evaluation results are shown in Table 1.

<Particle Size Distribution>

The measurement was made using the Flow Particle Image Analyzer as follows.

The Analyzer is capable of measuring toner, toner particles, and an external additive agent.

First, 10 ml of water wherein no more than 20 particles having a predetermined size were present per $10^{-3}$ cm$^3$ was prepared using a filter for removing fine foreign particles. The predetermined size was, for example, between 0.60 and 159.21 μm of the diameter of an equivalent circle. Then, to the water, several drops of nonionic surfactant (preferably Contaminon made by Wako Pure Chemical Industries) were added. Then, 5 mg of a sample of measurement target (particles) was added. Then, a dispersing process was performed using an ultrasonic disperser (UH-50 made by STM) under conditions of 20 kHz, and 50 W/10 cm$^3$; further, the dispersing process was performed for a total of 5 minutes to obtain a sample disperse liquid wherein the sample particles were present at a density between 4000 and 8000/$10^{-3}$ cm$^3$ (targeting at the particles in the measurement equivalent circle). Then, the size distribution of the particles that had the predetermined size (0.60 to 159.21 μm) was measured.

The sample disperse liquid was made to flow on a channel of a flat transparent flow cell (thickness of about 200 μm), wherein the channel was extended in the flowing direction. A stroboscope was arranged on one side of the flow cell, and a CCD camera was arranged on the other side of the flow cell such that an optical path was formed crossing the thickness of the flow cell. While the sample disperse liquid was flowing, a stroboscope light was irradiated at intervals of 1/30 second, and images of the particles flowing on the flow cell were obtained, wherein each particle was shown as an area in two dimensions parallel to the flow cell. An equivalent circle diameter is determined such that the area of the equivalent circle is equal to the area of the 2-dimensional image of the particle.

The equivalent circle diameters of over 1200 particles were measured in about one minute; and the numbers based on the distribution of the circle equivalent diameters, and a ratio (number %) of particles having a specified equivalent circle diameter were obtained. Results (frequency % and accumulation %) could be obtained for a range between 0.06 and 400 μm divided into 226 channels (30 channels per octave) as shown in Table 1. Nevertheless, in actual measurement, particles having an equivalent circle diameter between 0.60 and 159.21 μm were measured.

<Amount of Charge>

An amount of electric charge was measured with a suction type charge-to-mass ratio measuring apparatus. Specifically, 200 to 250 mg of the toner was suctioned into a Faraday cage that has a filter for collecting the toner, and an electro meter is connected such that the total charge amount of the sucked toner was measured. The mass of the toner was determined by an increase in the mass of the filter that was beforehand measured with a chemical balance of 5-figure accuracy. The total charge amount was divided by the mass of the toner on the filter to obtain a charge amount (q/m) of a unit mass. The suction type charge-to-mass ratio measuring apparatus was available from Trek Japan, Inc. (Model 210HS-2A); nevertheless, a handmade apparatus having the same configuration was used. The filter for collecting the toner was a glass microfiber (made by Whatman) having a diameter of 21 mm. Although there was almost no measurement difference by suction time (duration), the suction time was specified to be within 30 seconds.

<Charge Amount Under Normal Temperature and High Humidity (NH)>

The charge amount of the sample was measured in an environmental laboratory wherein the temperature was 30 degrees C., and the relative humidity was 90% after the sample had been left under the conditions for 12 hours.

<Distribution of the Charge Amount>

The distribution of the charge amounts of the toner were measured with a charge amount distribution analyzer (E-Spart Analyzer EST-2 made by HOSOKAWA MICRON CORP.). Specifically, the toner was directly supplied to a toner inhalation opening of the analyzer with a feeder at a constant rate, and the distribution amount of the charge amount was measured.

As an index of the distribution of the charge amount, the so-called half-value width is used. Specifically, such width is a distance between a value [q/d] of the greatest frequency (peak value) and a value of ½ of the greatest frequency (½ peak value). Although it is desirable that the distribution amount of the charge amount be small (sharp) as a desired characteristic of the toner, there is a general tendency that the greater the half-value width is, the greater the amount of charge is.

<Thin-Line Reproducibility>

The toner was put into a development unit of a commercial copying apparatus (Imagio Neo 271 made by Ricoh Co., Ltd.), where the development unit was modified for the purpose of the embodiment. Copying was carried out using type 6000 paper made by Ricoh Co., Ltd. at 7% coverage. A thin-line part of the image of the 10th sheet and the same part of the 30,000th sheet were compared with the original manuscript using an optical microscope for an expanded view of 100 times. Evaluation was made into four grades, comparing a state of omission of the line with grade samples. Image quality (thin-line reproducibility) was high in the order of A>B>C>D in Table 1. Here, the case that was evaluated as D was not acceptable for a commercial product. Where the toner had a negative charging polarity, an organic electrostatic latent-image supporting object was used. Where the toner had a positive charging polarity, an amorphous silicone electrostatic latent-image supporting object was used.

The development was carried out using two methods. According to the development method 1, the toner was directly conveyed to a development section by an air current, and the development was carried out with a powder cloud.

According to the development method 2, a resin coated carrier such as used in a conventional electronic photography was used as conveyance means. The carrier was made of materials as follows.

[Carrier]
Core material: globular form ferrite particles of 50 μm mean diameter
Coating material: Silicone resin
Then, a silicone resin was dispersed in toluene, the dispersed liquid was adjusted, warmed, and spray coated to the core material. Then, the carrier particles with an average coat resin film thickness of 0.2 μm were obtained after calcinations and cooling.

Example 2

Example 2 was the same as Example 1, except that the diameter of the discharging holes (nozzles) 15 was 30 μm, and the amount of the ethyl acetate was 25840 weight parts. Then, the weight average particle diameter (D4) of the toner was 5.1 μm, and the number average particle diameter (Dn) was 4.8 μm. The obtained toner was evaluated as described above, and its result is shown in Table 1.

Example 3

Example 3 was the same as Example 1, except that the diameter of the discharging holes (nozzles) 15 was 5 μm, and the amount of the ethyl acetate was 400 weight parts. Then, the weight average particle diameter (D4) of the toner was 3.0 μm, and the number average particle diameter (Dn) was 2.8 μm. The obtained toner was evaluated as described above, and its result is shown in Table 1.

Example 4

Example 4 was the same as Example 1, except that the piezo-electric object serving as the electromechanical transducer 17 was replaced with one whose resonant frequency was 540 kHz such that the nozzle vibration frequency was made into 540 kHz. Then, the weight average particle diameter (D4) of the toner was 5.3 μm, and the number average particle diameter (Dn) was 4.9 μm. The obtained toner was evaluated as described above, and its result is shown in Table 1.

Example 5

Example 5 is the same as Example 1, except that the electromechanical transducer 17 was replaced with that of 1.2 MHz such that the nozzle vibration frequency was made into 1.2 MHz. Then, the weight average particle diameter (D4) of the toner was 5.5 μm, and the number average particle diameter (Dn) was 4.8 μm. The obtained toner was evaluated as described above, and its result is shown in Table 1.

Example 6

Example 6 was the same as Example 1, except that the discharging holes (nozzles) 15 were arranged at an interval of 75 μm. The effective number of the nozzles was about 1600. Then, the weight average particle diameter (D4) of the obtained toner was 5.4 μm, and the number average particle diameter (Dn) was 4.9 μm. The obtained toner was evaluated as described above, and its result is shown in Table 1.

Example 7

Example 7 was the same as Example 1, except that the discharging holes (nozzles) 15 were arranged at an interval of 50 μm. The effective number of the nozzles was about 2200. Then, the weight average particle diameter (D4) of the

Example 8

Example 8 was the same as Example 1, except that the thickness of the thin film 16 was 10 μm. Then, the weight average particle diameter (D4) of the obtained toner was 5.1 μm, and the number average particle diameter (Dn) was 5.0 μm. The obtained toner was evaluated as described above, and its result is shown in Table 1.

Example 9

Example 9 was the same as Example 1, except that the thickness of the thin film 16 was 50 μm. Then, the weight average particle diameter (D4) of the obtained toner was 5.2 μm, and the number average particle diameter (Dn) was 5.0 μm. The obtained toner was evaluated as described above, and its result is shown in Table 1. In addition, the vibration mode of the thin film 16 was measured by a vibration displacement meter. As a result, it was confirmed that the vibration was the first basic vibration wherein no node was present in the direction of the diameter of the thin film 16.

Example 10

Example 10 was the same as Example 1, except that the thickness of the thin film 16 was 200 μm. Then, the weight average particle diameter (D4) of the obtained toner was 5.2 μm, and the number average particle diameter (Dn) was 5.0 μm. The obtained toner was evaluated as described above, and its result is shown in Table 1. In addition, the vibration mode of the thin film 16 was measured by the vibration displacement meter. As a result, it was confirmed that the vibration was the third vibration mode wherein no node was present in the direction of the diameter of the thin film 16.

Example 11

Example 11 was the same as Example 1, except that the peak value of the sign wave serving as the driving signal applied to the piezo-electric object serving as the electromechanical transducer 17 was 40.0 V (98 kHz). Then, the weight average particle diameter (D4) of the obtained toner was 5.0 μm, and the number average particle diameter (Dn) was 4.6 μm. The obtained toner was evaluated as described above, and its result is shown in Table 1. In addition, in this case, the pressure applied to the toner-containing liquid 10 was calculated to be about 500 kPa based on the displacement amount that was measured. Under such conditions, the toner-containing liquid 10 was continuously and stably discharged without clogging.

Example 12

Example 12 was the same as Example 1, except that the area wherein the nozzles 15 were formed was a circle, at the periphery of which circle, the amount of displacement was equal to ½ of the maximum displacement at the center; specifically, the area was a circle having a diameter of 2.4 mm. Then, the weight average particle diameter (D4) of the obtained toner was 5.0 μm, and the number average particle diameter (Dn) was 4.6 μm. The obtained toner was evaluated as described above, and its result is shown in Table 1. In addition, in this case, the pressure applied to the toner-containing liquid 10 was calculated to be about 500 kPa based on the displacement amount that was measured. Under such conditions, the toner-containing liquid 10 was continuously and stably discharged without clogging.

Example 13

Example 13 was the same as Example 1, except that the soft X-ray irradiation apparatus 43A serving as the charge removing unit 43 was replaced by a plasma generator (plasma irradiation apparatus) 43B that uses barrier electric discharge. Then, no toner particles were adhered to the wall, the weight average particle diameter (D4) of the obtained toner was 5.1 μm, and the number average particle diameter (Dn) was 4.9 μm. The obtained toner was evaluated as described above, and its result is shown in Table 1.

Comparative Example 1

—Manufacturing Toner Containing Disperse Liquid—
The disperse liquid of colorant, and the disperse liquid of wax were prepared under the same conditions as Example 1; and the toner-containing disperse liquid wherein a resin, the disperse liquids of colorant and wax were dispersed was prepared under the same conditions as Example 1.

—Production of Toner—
Comparative Example 1 differs from Example 1 in that the apparatus of Example 1 was replaced with a storage unit for storing the toner-containing disperse liquid, and a head unit that is configured to breathe out droplets from nozzles by an impulse wave being applied to the storage unit, which impulse wave was generated by expansion and contraction of a piezo-electric. Such droplets were dried and solidified to make toner particles. To further clarity, in Example 1, droplets were produced by vibrating the thin film wherein the nozzles were formed; in contrast, in Comparative Example 1, the droplets were produced by vibrating the storage unit.

[Toner Producing Conditions]
Disperse liquid specific gravity: $\rho=1.1888$ g/cm$^3$
Dry air flow: Air in the apparatus 3.0 L/min
Temperature in apparatus: 27-28 degrees C.
Dry air (dew point temperature): −20 degrees C.
Piezo-electric pulse frequency: 20 kHz The toner particles (dried and solidified) were collected with a filter having 1 μm holes with suction. The size distribution of the collected particles was measured with the flow-type particle image analyzer (FPIA-2000). Then, the weight average particle diameter was 7.8 μm, and the number average particle diameter was 5.2 μm, that is, the toner particles according to Comparative Example 1 had widely distributed sizes as shown in the FIG. 16 (an image taken by scanning-electron-microscope photography of the toner particles according to Comparative Example 1).

The obtained toner was evaluated as described above, and its result is shown in Table 1.

Comparative Example 2

—Manufacturing Toner Containing Disperse Liquid—
The toner-containing disperse liquid wherein resin, wax, and colorant were dispersed was prepared under the same conditions as Example 1.

—Production of Toner—
Comparative Example 2 differs from Example 1 in that the apparatus of Example 1 was replaced with a storage unit for storing the toner-containing disperse liquid, and a head unit that is configured to breathe out droplets from nozzles by an impulse wave being applied to the storage unit, which impulse wave was generated by expansion and contraction of a piezo-electric device and further converged with an acoustic lens. Such droplets were dried and solidified to make toner particles. To further clarify, in Example 1, droplets were produced by vibration of the thin film wherein the nozzles were formed; in contrast, in Comparative Example 2, the droplets were produced by vibrating the storage unit.

The toner particles (dried and solidified) were collected with a filter having 1 μm holes with suction. The size distribution of the collected particles was measured with the flow-type particle image analyzer (FPIA-2000). Then, the weight average particle diameter was 7.2 μm, and the number average particle diameter was 5.6 μm, that is, the toner particles according to Comparative Example 2 had widely distributed sizes.

The obtained toner was evaluated as described above, and its result is shown in Table 1.

Comparative Example 3

Comparative Example 3 is the same as Example 1, except that the peak of the sign wave serving as the drive signal applied to the piezo-electric object serving as the electromechanical transducer 17 was 120.0 V (98 kHz). Then, the weight average particle diameter (D4) of the obtained toner was 4.9 μm, and the number average particle diameter was 3.8 μm. The obtained toner was evaluated as described above, and its result is shown in Table 1. Here, the pressure applied to the toner-containing liquid 10 was determined to be about 1 MPa based on the measurement result of the displacement. In Comparative Example 3, small droplets other than the main droplet were formed; and resulted in that minute particles having a diameter of 2 μm or less were contained in the obtained toner. The obtained toner was evaluated as described above, and its result is shown in Table 1.

TABLE 1

| | NH | | Charge distribution (fC/μm) | | Thin line reproducibility | |
|---|---|---|---|---|---|---|
| | Charge (μC/g) | Charge (μC/g) | Peak | Half-value | Method 1 | Method 2 |
| EX 1 | −32.0 | −30.8 | −0.44 | 0.14 | A | A |
| EX 2 | −32.5 | −31.1 | −0.44 | 0.15 | A | A |
| EX 3 | −37.5 | −33.6 | −0.47 | 0.17 | A | B |
| EX 4 | −32.5 | −30.8 | −0.45 | 0.14 | A | A |
| EX 5 | −31.2 | −30.4 | −0.40 | 0.15 | A | A |
| EX 6 | −30.4 | −27.7 | −0.37 | 0.16 | A | B |
| EX 7 | −29.7 | −27.8 | −0.37 | 0.18 | B | B |
| EX 8 | −32.2 | −30.5 | −0.33 | 0.15 | A | A |
| EX 9 | −31.5 | −30.0 | −0.41 | 0.16 | A | A |
| EX 10 | −32.7 | −30.3 | −0.42 | 0.14 | B | B |
| EX 11 | −30.9 | −29.8 | −0.41 | 0.18 | A | A |
| EX 12 | −32.3 | −30.1 | −0.39 | 0.16 | A | B |
| EX 13 | −30.1 | −31.1 | −0.44 | 0.14 | B | B |
| CM EX 1 | −25.4 | −24.3 | −0.18 | 0.25 | C | D |
| CM EX 2 | −27.4 | −26.4 | −0.24 | 0.32 | B | C |
| CM EX 3 | −36.8 | −24.5 | −0.22 | 0.37 | C | C |

EX: Example
CM EX: Comparative Example

As shown in Table 1, efficient manufacture of high-quality toner is realized by the present invention. Further, the images developed with the toner according to embodiments of the present invention are of extremely high-quality and faithful to the electrostatic latent images.

Figure 18:
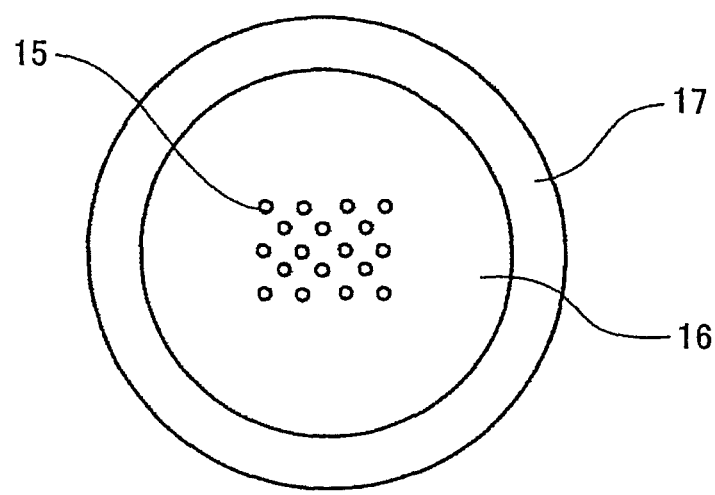
FIG. 18 is a bottom view of a first example of the droplet generating unit of the droplet generating apparatus of the toner manufacturing apparatus according to another embodiment of the present invention.
Figure 19:
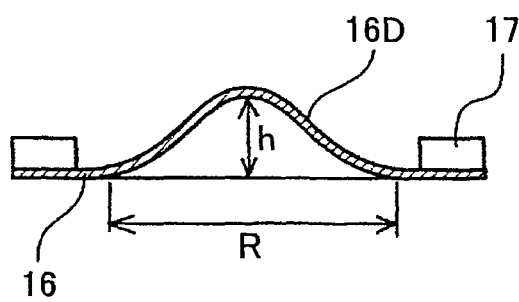
FIG. 19 is a cross-sectional view of the droplet generating unit.
Figure 20:
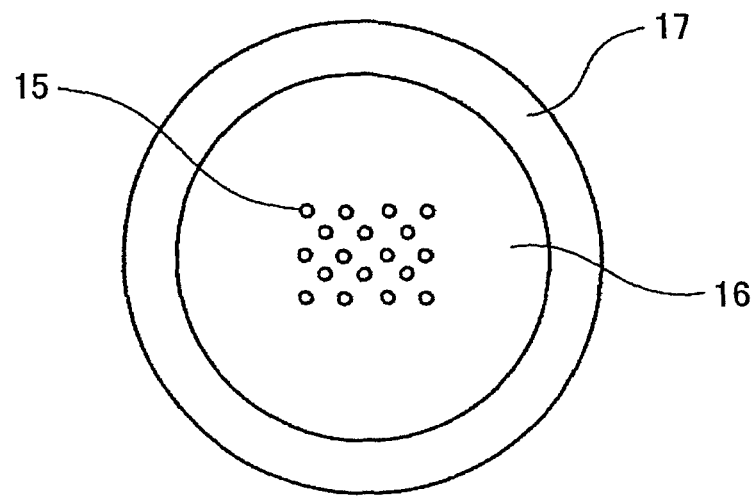
FIG. 20 is a bottom view of a second example of the droplet generating unit of the droplet generating apparatus of the toner manufacturing apparatus according to the embodiment.
Figure 21:
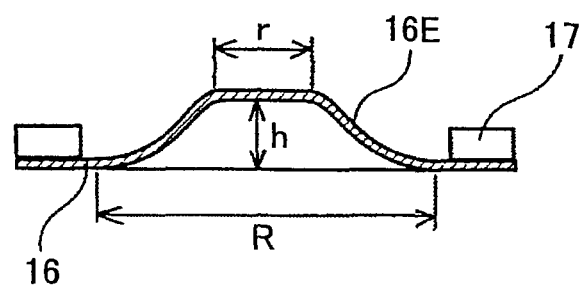
FIG. 21 is a cross-sectional view of the droplet generating unit.

Next, another embodiment of the toner manufacturing apparatus of the present invention is described with reference to FIGS. 18 through 21. FIG. 18 is a bottom view of a first example of the droplet generating unit of the toner manufacturing apparatus according to the embodiment of the present invention. FIG. 19 is a cross-sectional view of the droplet generating unit. FIG. 20 is a bottom view of a second example of the droplet generating unit of the toner manufacturing apparatus according to the embodiment. FIG. 21 is a cross-sectional view of the droplet generating unit.

According to the present embodiment, a convex part is formed to the thin film 16 of the droplet generating unit 11. Specifically, one of a convex part 16D (the first example as shown in FIG. 19), and a convex part 16E (the second example as shown in FIG. 21) is formed in the direction of droplet discharge. In the convex parts 16D and 16E, the nozzles 15 are formed.

According to the first example shown by FIGS. 18 and 19, the convex part 16D of the thin film 16 is shaped like a circular cone. When the height of the circular cone of the convex part 16D is expressed by h, and the base diameter (cone diameter) is expressed by R, a ratio R/h is desired to be between 14 and 40.

According to the second example shown by FIGS. 20 and 22, the convex part 16E of the thin film 16 is shaped like a truncated cone. When the height of the convex part 16E is expressed by h, the base diameter (cone diameter) is expressed by R, and the diameter of the upper surface (flat part) is expressed by r, the truncated cone is formed such that the ratio R/h is preferably between 14 and 40, and a ratio r/R is preferably between 0.125 and 0.375.

That is, the droplets 31 are formed by vibrating the thin film 16 with the annular vibrating unit such as the electromechanical transducer 17 formed in the perimeter (within the deformable domain) of the thin film 16 wherein the nozzles 15 are formed as described above. Here, the thin film 16 is vertically bent (displaced) with the vibration by the electromechanical transducer (annular vibrating unit) 17 that is annular in shape, and a great amount of the displacement of the thin film 16 is obtained such that the droplets 31 can be efficiently discharged.

Then, the inventors hereof have seriously studied about the shape of the thin film 16 that is capable of more efficiently generating the droplets 31 by efficiently transmitting the vibration provided by the annular vibrating unit 17 to the thin film 16, or by amplifying the vibration amplitude (displacement) of the thin film 16.

Specifically, in the case wherein the thin film 16 is shaped flat, only nozzles that are around the center of the thin film produced the droplets 31, which represents about 20% of all the nozzles. This is not sufficient in view of the need for efficient use of the nozzles 15. In other words, the number of droplets 31 discharged by the thin film 16 that has multiple nozzles is desired to be greater.

In order to improve the productivity of toner production, it is indispensable that the droplets 31 be efficiently produced from the nozzles 15 formed in the thin film 16. Especially, when the droplet generating apparatus 2 is arranged upstream of the granulating unit 3 (for charge-removing and drying), there is a limitation in a projected area of the droplet generating unit 11. In this connection, it is necessary that a ratio of effective nozzles is at least 70%; or more desirably 80% or even greater.

It is found that, if the thin film 16 is flat, the vibration provided by the annular vibrating unit 17 does not sufficiently bend the thin film 16 that has the nozzles 15.

Then, in order to obtain an efficient displacement vibration of the thin film 16, it is determined that it is suitable to provide a convex part such as 16D and 16E in the thin film 16, at least at a part thereof. Further, it is determined that there is an optimal range concerning the shape of the convex part for efficiently obtaining the droplets. Namely, desired ranges are found for the ratio of height to diameter of the convex part as described above with reference to the first and the second examples.

Here, the convex part 16D in the shape of a circular cone can be formed in the thin film 16 by first forming the nozzles in a flat thin film, and then by mechanically rolling the flat thin film. On the contrary, it is possible to first prepare a convex part in the thin film (without the nozzles), and then form the nozzles in the convex part by, e.g., laser beam machining. However, this is a process on a film that has curvature, and requires high precision mechanical processing. Accordingly, the method described first (that is, nozzles are formed in the flat thin film, and the thin film is rolled) is preferred.

For forming the convex part 16D in the thin film 16, a rod-like processing jig that is thin and sharp is pushed to the thin film 16 made of a metal. The position that is thus pushed is rolled, and the convex part 16D shaped like a circular cone is obtained. The height h of the convex part 16D can be controlled by changing the pressure of pushing the thin film 16. Depending on the strength and thickness of the metal thin film 16, the height h may be different for the same magnitudes of the pressure. As rolling progresses, the thin film is fractured; accordingly, there is a limitation of the height h that can be obtained. The maximum value of the height h of the convex part 16D is more dependent to the thickness of the thin film 16 than the kind of the metal of the thin film 16.

The convex part 16E that is shaped like a truncated cone (or a dome) is formed by changing the shape of the rod-like processing jig. Specifically, the tip part of the jig is made flat for this purpose.

Next, specific examples of the present embodiment are described. Nevertheless, the present invention is not limited to the following examples.

First, processing methods of forming the convex part to the thin film 16 having the nozzles 15 are described.

First, the convex part 16D was formed to the thin film 16 made of a 20 μm thick, and 9.5 mmφ nickel film, wherein the nozzles 15 were formed by the processing method described above. The process was performed for the height h from 75 μm to 300 μm in 25 μm steps. Here, the base diameter (cone diameter) R of the convex part was 4000 μm. In this case, no fracture occurred up to h=250 μm; however, at h=275 μm, a part of the thin film 16 was fractured.

Second, the same experiment as above was conducted, except that that the thin film 16 was made of a 20 μm thick platinum film. No fracture was generated up to h=250 μm; however, a part of the thin film 16 at a part between nozzles was fractured at h=275 μm.

Third, the same experiment as above was conducted, except that the thin film 16 was made of a 20 μm thick SUS304 film. No fracture was generated up to 225 μm, a crack was generated at a part between the nozzles 15 at 250 μm, and fracture was generated at 275 μm.

Based on the results as above, it was determined that the height h of the convex part 16D shaped like a circular cone having a base diameter of 4000 μm may be up to about 250 μm in the 20 μm thick thin film without receiving too much influence of the metal kind.

Further, an additional experiment was conducted, wherein the base diameter of the convex part was 5000 μm (instead of 4000 μm in the examples above), otherwise the same as the first example. In this case, no fracture was generated up to 300 μm, but a crack was generated at a part between the nozzles 15 at 325 μm.

Next, the processing jig was replaced with the one that had the shape of a disk at the tip for forming the convex part 16E that is shaped like a truncated cone.

First, the convex part 16E was formed to a 20 μm thick, and 9.5 mmφ nickel thin film having the nozzles 15 according to the processing method described above, wherein the disk diameter of the rod-like processing jig was changed from 500 μm to 3000 μm in 500 μm steps. Furthermore, the height h of the convex part 16E was changed from 75 μm to 350 μm in 25 μm steps. Further, the base diameter (cone diameter) R of the convex part 16E was 4000 μm.

As a result, when the disk diameter was between 500 μm and 1000 μm, no fracture was generated up to h=250 μm; however, at h=275 μm, a part of the thin film 16 was fractured. Further, when the disk diameter was 1500 μm, no fracture was generated up to h=225 μm; however, at h=250 μm, a part of the thin film was fractured. Furthermore, when the disk diameter was 2000 μm, although no fracture was generated up to 225 μm, the height h of the convex could not reach 250 μm.

Based on the results obtained as above, it was determined that, due to fracture of the metal thin film by rolling, an upper limit of the ratio R/h was about 14, where R is the diameter of the base of the circular cone of the convex part 16D that was formed in the thin film 16 having the nozzles 15. Further, it was determined that the dome-like (truncated cone) convex part 16E could be manufactured at the ratio R/h=16, where the ratio r/R was between 0.125 and 0.375, where r is the diameter of the top of the circular cone shape.

A utilization rate of the nozzles 15 of the manufactured thin films was obtained as shown in Table 2. Here, the utilization rate of the nozzles 15 is defined as a percentage of an actually measured amount (ml/min.) of the liquid that was discharged as the droplets to an ideal amount (ml/min.) of the liquid that would be discharged at a fixed frequency if all the nozzles were producing.

A nozzle ID number was given to each of the thin films having a different shape of the nozzle section; namely, with a convex part of the circular cone, with a convex part of the truncated circular cone, and without a convex part.

As shown in Table 2, droplet discharging efficiency is remarkably increased if at least a part of the thin film 16 having the nozzles 15 has a convex part in comparison with the flat thin film, that is, without a convex part.

Further, if the ratio R/h is between 14 and 40, more preferably between 15 and 27, the convex part 16D in the shape of the circular cone can be manufactured, and the droplet discharging efficiency, i.e., toner productivity is great.

Furthermore, in the case wherein the convex is shaped like the truncated cone, like the convex part 16E, the droplet discharging efficiency reaches nearly 90% or even greater, if R/h is between 14 and 40 (or more preferably between 15 and 27), and r/R is between 0.125 and 0.375 (or more preferably between 0.25 and 0.375).

—Production of Thin Film Having Two or More Nozzles—

All the thin films 16 described above wherein two or more nozzles 15 were formed were made of a 20 μm nickel thin film using the electro forming method. The nozzles 15 were arranged in the shape of a hound's-tooth check at intervals of 100 μm all over the thin film 16. The diameter of all the nozzles 15 was in a range of 10±0.5 μm. The convex part was made by pushing only the center section of the thin film 16 with the rod-like processing jig, wherein the circumference of the thin film 16 was fixed from above and under.

TABLE 2

| ID | Convex heighth (μm) | CCBD (μm) | TCTPD (μm) | R/h | R/r | PR | DDF |
|---|---|---|---|---|---|---|---|
| 1 | 75 | 4000 | NA | 53.3 | NA | NP | 48.2 |
| 2 | 100 | 4000 | NA | 40.0 | NA | NP | 65.7 |
| 3 | 150 | 4000 | NA | 28.7 | NA | NP | 73.5 |
| 4 | 200 | 4000 | NA | 20.0 | NA | NP | 82.1 |
| 5 | 250 | 4000 | NA | 16.0 | NA | NP | 87.2 |
| 6 | 275 | 4000 | NA | 14.5 | NA | CR | 90.3 |
| 7 | 100 | 5000 | NA | 50.0 | NA | NP | 45.8 |
| 8 | 125 | 5000 | NA | 40.0 | NA | NP | 63.7 |
| 9 | 325 | 5000 | NA | 15.4 | NA | NP | 85.4 |
| 10 | 350 | 5000 | NA | 14.2 | NA | CR | 91.3 |
| 11 | 250 | 4000 | 500 | 16.0 | 0.125 | NP | 88.9 |
| 12 | 250 | 4000 | 1000 | 16.0 | 0.25 | NP | 91.3 |
| 13 | 250 | 4000 | 1500 | 16.0 | 0.375 | NP | 93.5 |
| 14 | 250 | 4000 | 2000 | 16.0 | 0.50 | UM | UA |
| 15 | NA | NA | NA | NA | NA | NA | 17.6 |

ID: Nozzle ID No.
CCBD: Circular cone base diameter
TCTPD: Truncated cone top part diameter
PR: Production
DDF: Droplets discharge efficiency
NA: Not Applicable
NP: No Problem
CR: Cracked
UM: Unable to make
UA: Unavailabe Then, some of the thin films as identified above were employed to manufacture the toner under the following conditions, and performance evaluation was carried out. For comparison purposes, the nozzle identified as No. 15, with no convex part, was included.

Example 14

In Example 14, Nozzle ID No. 2 as identified in Table 2 was used.

—Preparing Colorant Disperse Liquid—

First, the disperse liquid of carbon black as colorant was prepared.

Specifically, 17 mass parts of carbon black (Regal400; made by Cabot), and 3 mass parts of a dispersing agent (Ajisper PB821 made by Ajinomoto Fine Techno) were dispersed into 80 mass parts of ethyl acetate with a mixer that had an agitation blade to obtain a primary disperse liquid. The Dyno mill was used so that aggregates in the primary (colorant) disperse liquid be made finer with the powerful shear force of the mill, and the secondary (colorant) disperse liquid was obtained wherein no aggregates greater than 5 μm in diameter were present.

—Preparing Wax Disperse Liquid—

Next, the wax disperse liquid was prepared.

Specifically, 18 mass parts of carnauba wax and 2 mass part wax dispersant were dispersed in 80 mass parts of ethyl acetate, where the mixer having the agitating blade was used, to obtain the primary (wax) disperse liquid. The primary disperse liquid was warmed up to 80 degrees C., while stirring the liquid, so that the carnauba wax could be dissolved; then, the liquid was cooled down to the room temperature so that wax particles were deposited. The wax dispersant was polyethylene wax to which styrene-acrylate butyl copolymer was grafted.

The Dyno mill was used so that aggregates in the primary (wax) disperse liquid be made finer with the powerful shear force of the mill, and the secondary (wax) disperse liquid was obtained wherein no aggregates greater than 2 μm in diameter were present.

—Preparing Toner Containing Disperse Liquid—

Next, the toner containing disperse liquid that includes the bonding resin, the colorant disperse liquid, and the wax disperse liquid was prepared.

Specifically, 100 mass parts of polyester resin serving as the bonding resin, 30 mass parts of the colorant disperse liquid, and 30 mass parts of the wax disperse liquid were dispersed in 840 mass parts of ethyl acetate using the mixer having the agitation blade for 10 minutes so that the ingredients were uniformly dispersed. A shock due to the solvent dilution did not generate any wax or colorant particles. In addition, the electrolytic conductivity of this disperse liquid was $1.8 \times 10^{-7}$ S/m.

—Production of Toner—

The thin film 16 that has the convex part 16D (Nozzle ID No. 2) was arranged in the droplet generating apparatus 2 of the toner manufacturing apparatus 1 of the embodiment of the present invention, and the obtained toner-containing disperse liquid was supplied to the nozzles 15 of the droplet generating apparatus 2.

Droplets of the toner-containing disperse liquid were produced under the following Toner producing conditions, and were dried and solidified to obtain the toner particles.

[Toner Producing Conditions]

Dry air flow: Nitrogen for disperse 2.0 L/min.; nitrogen for drying 30.0 L/min.

Temperature in apparatus: 27-28 degrees C.

Nozzle vibration frequency: 103 kHz

The dried and solidified toner particles were sucked and collected with a filter having 1 μm holes. The particle size distribution of the collected particles was measured with the Flow Particle Image Analyzer (FPIA-2000) by the same method as described above with reference to Example 1. The weight average particle diameter (D4) of the toner particles was 5.2 μm, and the number average particle diameter (Dn) was 4.9 μm; that is D4/Dn of the toner particles was equal to 1.06.

—Evaluation of Toner—

The following evaluations were performed about the obtained toner; a result thereof is shown in Table 3.

<Particle Size Distribution>

As described with reference to Example 1 of the embodiment, the Flow Particle Image Analyzer was used to determine the particle size distribution.

<Amount of Charge>

As described with reference to Example 1 of the embodiment, the amount of electric charge was measured with a suction type charge-to-mass ratio measuring apparatus.

<The Amount of Charge Under Normal Temperature and High Humidity (NH)>

The same method as described with reference to Example 1 was used to determine the amount of charge under normal temperature and high humidity (NH).

<Distribution of Charge Amount>

The same method as described with reference to Example 1 was used to determine the distribution amount of the charge using the E-Spart analyzer EST-2 made by HOSOKAWA MICRON CORP.

<Thin-Line Reproducibility>

The same method as described with reference to Example 1 was used to determine the thin-line reproducibility using a copying machine Imagio Neo 271 made by Ricoh; accordingly, details are not repeated.

Example 15

Example 15 was the same as Example 14, except that the Nozzle ID No. 5 was used instead of No. 2. The weight average particle diameter (D4) of the obtained toner was 5.1 μm, and the number average particle diameter (Dn) was 4.9 μm. The ratio D4/Dn was 1.04. The evaluation as described above was performed about the obtained toner, a result of which is shown in Table 3.

Example 16

Example 16 was the same as Example 14, except that the Nozzle ID No. 9 was used instead. The weight average particle diameter (D4) of the obtained toner was 5.0 μm, and the number average particle diameter (Dn) was 4.8 μm. The ratio D4/Dn was 1.04. The evaluation as described above was conducted, result of which is shown in Table 3.

Example 17

Example 17 is the same as Example 14, except that the Nozzle ID No. 12 was used instead. The weight average particle diameter (D4) of the obtained toner was 5.0 μm, and the number average particle diameter (Dn) was 4.9 μm. The ratio D4/Dn was 1.02. The evaluation as described above was conducted, result of which is shown in Table 3.

Comparative Example A

Comparative Example A was the same as Example 14, except that the Nozzle ID No. 15 was used. The weight average particle diameter (D4) of the obtained toner was 5.0 μm, and the number average particle diameter (Dn) was 4.8 μm. The ratio D4/Dn was 1.04. However, Comparative Example A took a time about 4 to 5 times as long compared with Examples 14 through 17 for obtaining the same quantity of the toner. In other words, if the same amount of the toner were to be obtained in the same period, 4 to 5 times as many of the droplet generating units 11 would be required. Here, the evaluation as described above was performed about the obtained toner, and a result is shown in Table 3.

Comparative Example B

Comparative Example B was the same as the Example 14, except that the Nozzle ID No. 11 was used. The weight average particle diameter (D4) of the obtained toner was 6.7 μm, and the number average particle diameter (Dn) was 5.8 μm. The ratio D4/Dn was 1.16. However, the thin film 16 with the Nozzle ID No. 11 was totally fractured after continuously operating for 50 minutes, and the experiment could not be continued. Based on a fact that the average particle diameter was greater than targeted, it was assumed that droplets were united as cracks gradually spread. The evaluation as described above was performed about the toner obtained here. The result is shown in Table 3.

TABLE 3

|  | NH | | CD (fC/μm) | | TLR | |
|---|---|---|---|---|---|---|
|  | Charge (μC/g) | Charge (μC/g) | Peak | Half-value | Method 1 | Method 2 |
| EX 14 | −35.0 | −32.9 | −0.40 | 0.14 | A | A |
| EX 15 | −37.5 | −34.3 | −0.39 | 0.15 | A | A |
| EX 16 | −33.5 | −30.2 | −0.34 | 0.16 | A | B |
| EX 17 | −36.5 | −33.8 | −0.38 | 0.19 | A | A |

TABLE 3-continued

|  | NH | | CD (fC/μm) | | TLR | |
|---|---|---|---|---|---|---|
|  | Charge (μC/g) | Charge (μC/g) | Peak | Half-value | Method 1 | Method 2 |
| CEX A | −32.4 | −27.3 | −0.38 | 0.15 | A | B |
| CEX B | −27.4 | −23.4 | −0.24 | 0.18 | B | C |

EX: Example
CEX: Comparative Example
CD: Charge distribution
TLR: Thin line reproducibility The toner of the present invention is efficiently manufactured by the toner manufacturing method of the present invention, as embodied herein. Further, the toner has desired characteristics as shown in Table 3. The image developed from the latent image by the toner is a faithful copy providing remarkably high quality.

As described, the toner manufacturing method of the present invention realized an efficient manufacturing of the toner, wherein the particle distribution is unprecedentedly mono-distribution. Also the distributions of fluidity characteristic and charging nature are practically zero or very small compared with the conventional cases. Accordingly, the toner can suitably be used by a development unit of an electrostatic latent image of electronic photography, electrostatic recording, electrostatic printing, and the like.

Further, the present invention is not limited to these embodiments, but variations and modifications may be made without departing from the scope of the present invention.

The present application is based on Japanese Priority Application No. 2007-073577 filed on Mar. 20, 2007, and Japanese Priority Application 2007-116226 filed on Apr. 25, 2007 with the Japanese Patent Office, the entire contents of which are hereby incorporated by reference.

The invention claimed is:

1. A toner manufacturing method, comprising:
    a droplet generating step of controlling a droplet generating unit that includes a thin film, a plurality of nozzles formed in a deformable domain of the thin film, and an annular vibrating unit that is arranged at a liquid discharge side, and at a perimeter of the deformable domain, of the thin film for vibrating the thin film to cause droplets of a toner-containing liquid including at least a resin and a colorant to be breathed out by causing a bending vibration to the deformable domain of the thin film to deform the thin film; and
    a granulating step of allowing the breathed out droplets to solidify and to form toner particles wherein a ratio of ΔL max/ΔL min is no greater than 2.0, so as to form the toner particles within a determined range of particle sizes distribution, where ΔLmax is a greatest amount of displacement of the thin film in a direction of vibration, and ΔLmin is a smallest amount of displacement of the thin film in the direction of vibration.

2. The toner manufacturing method as claimed in claim 1, wherein a convex part, protruding in a direction of the droplets being breathed out, is formed in the thin film, and the nozzles are formed in the convex part.

3. The toner manufacturing method as claimed in claim 2, wherein the convex part having a shape of a circular cone, wherein a ratio R/h is between 14 and 40, where R is a diameter of a base of the circular cone, and h is a height of the circular cone.

4. The toner manufacturing method as claimed in claim 2, wherein the convex part having a shape of a truncated cone, wherein a ratio R/h is between 14 and 40, and a ratio r/R is between 0.125 and 0.375, where R is a diameter of a base of the truncated cone, h is a height of the truncated cone, and r is a diameter of a top surface of the truncated cone.

5. The toner manufacturing method as claimed in claim 1, wherein the droplet generating unit vibrates the thin film in a vibration mode that does not generate a node in a diameter direction of the thin film.

6. The toner manufacturing method as claimed in claim 1, wherein the droplet generating unit vibrates the thin film at a frequency between 20 kHz and 2.0 MHz.

7. The toner manufacturing method as claimed in a claim 1, wherein an electric charge of the toner particles is removed at a charge removing step.

8. The toner manufacturing method as claimed in claim 1, wherein the toner particles are collected by a flow of a gas.

* * * * *